US010285105B2

(12) United States Patent
Chen et al.

(10) Patent No.: US 10,285,105 B2
(45) Date of Patent: May 7, 2019

(54) METHOD, DEVICE, AND SYSTEM FOR ESTABLISHING VIRTUAL BASE STATION AND TRANSFERRING DATA

(71) Applicant: Huawei Technologies Co., Ltd., Shenzhen (CN)

(72) Inventors: Xueliang Chen, Shenzhen (CN); Dan Li, Shenzhen (CN); Li Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 14/722,661

(22) Filed: May 27, 2015

(65) Prior Publication Data

US 2015/0264616 A1 Sep. 17, 2015

Related U.S. Application Data

(63) Continuation of application No. PCT/CN2013/079028, filed on Jul. 9, 2013.

(30) Foreign Application Priority Data

Nov. 27, 2012 (CN) .......................... 2012 1 0490700

(51) Int. Cl.
*H04W 36/00* (2009.01)
*H04W 36/26* (2009.01)
(Continued)

(52) U.S. Cl.
CPC .......... *H04W 36/26* (2013.01); *H04W 16/26* (2013.01); *H04W 24/02* (2013.01);
(Continued)

(58) Field of Classification Search
None
See application file for complete search history.

(56) References Cited

U.S. PATENT DOCUMENTS 7,826,841 B2  11/2010  Lu et al.
7,826,842 B2  11/2010  Buckley et al.
(Continued)

FOREIGN PATENT DOCUMENTS

CN  101888631 A  11/2010
CN  101945391 A  1/2011
EP  2 180 743 A1  4/2010

*Primary Examiner* — Willie J Daniel, Jr.
(74) *Attorney, Agent, or Firm* — Brinks Gilson & Lione

(57) ABSTRACT

A method for establishing a virtual base station includes: receiving a message of poor network coverage sent by an operator server, where the message includes information of a location where network coverage is poor and information of a second mode; acquiring, according to the information of the location and the information of the second mode, a multimode terminal capable of being compatible with the second mode; returning an identification of the multimode terminal to the operator server; receiving a virtual base station establishment request message sent by the operator server; forwarding, according to the identification of the multimode terminal, the virtual base station establishment request message to the multimode terminal; and forwarding a virtual base station successfully-established message to the operator server.

13 Claims, 18 Drawing Sheets

(51) Int. Cl.
*H04W 16/26* (2009.01)
*H04W 24/02* (2009.01)
*H04W 36/04* (2009.01)
*H04W 36/38* (2009.01)
*H04W 88/04* (2009.01)

(52) U.S. Cl.
CPC ....... *H04W 36/0016* (2013.01); *H04W 36/04* (2013.01); *H04W 36/38* (2013.01); *H04W 88/04* (2013.01)

(56) References Cited

U.S. PATENT DOCUMENTS

| | | | |
|---|---|---|---|
| 8,279,819 B2* | 10/2012 | Sawai | H04W 74/02 370/329 |
| 8,699,456 B2* | 4/2014 | Smadi | H04W 36/08 370/331 |
| 2009/0221265 A1 | 9/2009 | Liu et al. | |
| 2010/0091711 A1 | 4/2010 | Sawai | |
| 2010/0124930 A1 | 5/2010 | Andrews et al. | |
| 2012/0099562 A1 | 4/2012 | Smadi et al. | |

* cited by examiner

METHOD, DEVICE, AND SYSTEM FOR ESTABLISHING VIRTUAL BASE STATION AND TRANSFERRING DATA

CROSS-REFERENCE TO RELATED APPLICATIONS

This application is a continuation of International Application No. PCT/CN2013/079028, filed on Jul. 9, 2013, which claims priority to Chinese Patent Application No. 201210490700.4, filed on Nov. 27, 2012, both of which are hereby incorporated by reference in their entireties.

TECHNICAL FIELD

The present invention relates to the field of communications and, in particular, to a method, a device, and a system for establishing a virtual base station and transferring data.

BACKGROUND

Currently, communications networks of various wireless modes have been widely used, but in a wireless network system, coverage of wireless signals has been a tough problem. At present, generally, a solution to such problem is to deploy a Femto base station in a specific area, or buy a Femto base station by a user and deploy the same in a specific area, to solve the coverage problem of the radio signals by deploying the Femto base station. Considering a high deployment cost of the Femto base station, in an existing technical solution, time-frequency resources of an air interface are split to form different segments so as to form a virtual base station, the coverage of signals is realized through the virtual base station formed, thus resource utilization may be improved, and the problem of high costs is solved.

During a process of realizing the above technical solution, different segments are formed by splitting the time-frequency resources of an air interface so as to form a virtual base station, which can reduce costs but needs a scheduling algorithm to perform a scheduling when the time-frequency resources of the wireless air interface are split. Furthermore, the resources need to be effectively isolated by using an algorithm-based splitting method, and a realization process thereof is relatively complicated.

SUMMARY

Embodiments of the present invention provide a method, a device and a system for establishing a virtual base station and transferring data, which can flexibly and conveniently achieve radio network coverage in a specific area at a lower cost.

In order to achieve the above objective, embodiments of the present invention employ following technical solutions:

In a first aspect, an embodiment of the present invention provides a method for establishing a virtual base station, which relates to a side of an operator server, including:

when a network coverage level in a network of a second mode is detected to be lower than a preset network coverage threshold, sending a notification message of poor network coverage to a wireless network controller, where the notification message of the poor network coverage includes information of a location where the network coverage level of the second mode is lower than the network coverage threshold and information of the second mode;

receiving an identification of a multimode terminal returned by the wireless network controller, where the multimode terminal is capable of being compatible with the second mode and operates in a first mode, and the multimode terminal is acquired by the wireless network controller according to the information of the location and the information of the second mode;

initiating a virtual base station establishment request message to the wireless network controller, where the virtual base station establishment request message includes the identification of the multimode terminal and the information of the second mode; forwarding, by the wireless network controller, the virtual base station establishment request message to the multimode terminal according to the identification of the multimode terminal, to enable the multimode terminal to generate a virtual machine and load a virtual base station mirror that is the same as the second mode to generate the virtual base station;

receiving a virtual base station successfully-established message that is sent by the multimode terminal and forwarded by the wireless network controller, where the virtual base station successfully-established message includes an identification of the virtual base station;

after receiving the virtual base station successfully-established message, initiating a service information modification request message to a core network of the multimode terminal, where the service information modification request message includes information of a default bearer, a dedicated bearer, charging and a bandwidth of the second mode, so as to satisfy a service requirement of at least one terminal of the second mode served by the virtual base station; and after completing service information modification, sending a data transmission path establishment message to enable the core network of the multimode terminal to establish a data transmission path to a core network of the second mode according to the default bearer and the dedicated bearer of the second mode.

In a second aspect, an embodiment of the present invention further provides a method for establishing a virtual base station, which relates to a side of a wireless network controller, including:

receiving a notification message of poor network coverage sent by an operator server, where the notification message of the poor network coverage is sent by the operator server when a network coverage level in a network of a second mode is detected to be lower than a preset network coverage threshold, and includes information of a location where the network coverage level of the second mode is lower than the network coverage threshold and information of the second mode;

acquiring, according to the information of the location and the information of the second mode, a multimode terminal capable of being compatible with the second mode;

returning an identification of the multimode terminal to the operator server;

receiving a virtual base station establishment request message sent by the operator server, where the virtual base station establishment request message includes the identification of the multimode terminal and the information of the second mode;

forwarding, according to the identification of the multimode terminal, the virtual base station establishment request message to the multimode terminal, to enable the multimode terminal to generate a virtual machine and load a virtual base station mirror that is the same as the second mode to generate the virtual base station;

receiving a virtual base station successfully-established message sent by the multimode terminal, where the virtual base station successfully-established message includes an identification of the virtual base station; and forwarding the virtual base station successfully-established message to the operator server.

In a third aspect, an embodiment of the present invention further provides a method for establishing a virtual base station, which relates to a side of a core network of a multimode terminal, including:

receiving a service information modification request message sent by an operator server, where the service information modification request message includes information of a default bearer, a dedicated bearer, charging and a bandwidth of a second mode, so as to satisfy a service requirement of at least one terminal of the second mode served by the virtual base station; and establishing a data transmission path to a core network of the second mode according to the default bearer and the dedicated bearer of the second mode.

In a fourth aspect, an embodiment of the present invention further provides a method for establishing a virtual base station, which relates to a side of a multimode terminal, including:

receiving a virtual base station establishment request message sent by an operator server and forwarded by a wireless network controller, where the virtual base station establishment request message includes an identification of a multimode terminal and information of a second mode;

generating a virtual machine, and loading a virtual base station mirror that is the same as the second mode to generate the virtual base station; and returning a virtual base station successfully-established message to the wireless network controller, where the virtual base station successfully-established message includes an identification of the virtual base station, and the virtual base station successfully-established message is forwarded to the operator server via the wireless network controller.

In a fifth aspect, an embodiment of the present invention provides a method for transferring data by using a virtual base station, which relates to a side of a multimode terminal, including:

receiving uplink data of a terminal of a second mode;

forwarding the uplink data to a core network of a multimode terminal to enable the core network of the multimode terminal to forward the uplink data to a core network of the second mode corresponding to the terminal of the second mode, where a data transmission path is established between the core network of the multimode terminal and the core network of the second mode;

the method further including:

receiving downlink data forwarded by the core network of the multimode terminal, where the downlink data is sent by the core network of the second mode; and sending the downlink data to the terminal of the second mode.

In a sixth aspect, an embodiment of the present invention further provides a method for transferring data by using a virtual base station, which relates to a side of a core network of a multimode terminal, including:

receiving uplink data sent by a multimode terminal, where the uplink data is sent to the multimode terminal by a terminal of the second mode;

forwarding the uplink data to a core network of the second mode;

the method further including:

receiving downlink data sent by the core network of the second mode; and forwarding the downlink data to the multimode terminal to enable the multimode terminal to forward the downlink data to the terminal of the second mode.

In a seventh aspect, an embodiment of the present invention provide an operator server, including:

a first sending unit, configured to send a notification message of poor network coverage to a wireless network controller when a network coverage level in a network of a second mode is detected to be lower than a preset network coverage threshold, where the notification message of the poor network coverage includes information of a location where the network coverage level of the second mode is lower than the network coverage threshold and information of the second mode;

a first receiving unit, configured to receive an identification of a multimode terminal returned by the wireless network controller, where the multimode terminal is capable of being compatible with the second mode and operates in a first mode, and the multimode terminal is acquired by the wireless network controller according to the information of the location and the information of the second mode;

where the first sending unit is further configured to initiate a virtual base station establishment request message to the wireless network controller, where the virtual base station establishment request message includes the identification of the multimode terminal and the information of the second mode; the wireless network controller forwards the virtual base station establishment request message to the multimode terminal according to the identification of the multimode terminal, to enable the multimode terminal to generate a virtual machine and load a virtual base station mirror that is the same as the second mode to generate a virtual base station;

the first receiving unit is further configured to receive a virtual base station successfully-established message that is sent by the multimode terminal and forwarded by the wireless network controller, where the virtual base station successfully-established message includes an identification of the virtual base station;

the first sending unit is further configured to, after receiving the virtual base station successfully-established message, initiate a service information modification request message to a core network of the multimode terminal, where the service information modification request message includes information of a default bearer, a dedicated bearer, charging and a bandwidth of the second mode, so as to satisfy a service requirement of at least one terminal of the second mode served by the virtual base station; and the first sending unit is further configured to, after completing service information modification, send a data transmission path establishment message to enable the core network of the multimode terminal to establish a data transmission path to a core network of the second mode according to the default bearer and the dedicated bearer of the second mode.

In an eighth aspect, an embodiment of the present invention provides a wireless network controller, including:

a second receiving unit, configured to receive a notification message of poor network coverage sent by an operator server, where the notification message of the poor network coverage is sent by the operator server when a network coverage level in a network of a second mode is detected to be lower than a preset network coverage threshold, and includes information of a location where the network coverage level of the second mode is lower than the network coverage threshold and information of the second mode;

a multimode terminal acquiring unit, configured to acquire, according to the information of the location and the information of the second mode, a multimode terminal capable of being compatible with the second mode;

a second sending unit, configured to return an identification of the multimode terminal to the operator server;

where the second receiving unit is further configured to receive a virtual base station establishment request message sent by the operator server, where the virtual base station establishment request message includes the identification of the multimode terminal and the information of the second mode;

the second sending unit is further configured to forward, according to the identification of the multimode terminal, the virtual base station establishment request message to the multimode terminal to enable the multimode terminal to generate a virtual machine and load a virtual base station mirror that is the same as the second mode to generate a virtual base station;

the second receiving unit is further configured to receive a virtual base station successfully-established message sent by the multimode terminal, where the virtual base station successfully-established message includes an identification of the virtual base station; and the second sending unit is further configured to forward the virtual base station successfully-established message to the operator server.

In a ninth aspect, an embodiment of the present invention provides a core network of a multimode terminal, including:

a third receiving unit, configured to receive a service information modification request message sent by an operator server, where the service information modification request message includes information of a default bearer, a dedicated bearer, charging and a bandwidth of a second mode, so as to satisfy a service requirement of at least one terminal of the second mode served by the virtual base station; and a data transmission path establishing unit, configured to establish a data transmission path to a core network of the second mode according to the default bearer and the dedicated bearer of the second mode.

In a tenth aspect, an embodiment of the present invention provides a multimode terminal, including:

a fourth receiving unit, configured to receive a virtual base station establishment request message sent by an operator server and forwarded by a wireless network controller, where the virtual base station establishment request message includes an identification of a multimode terminal and information of a second mode;

a virtual base station generating unit, configured to generate a virtual machine, and load a virtual base station mirror that is the same as the second mode to generate a virtual base station; and a fourth sending unit, configured to return a virtual base station successfully-established message to the wireless network controller, where the virtual base station successfully-established message includes an identification of the virtual base station, and the virtual base station successfully-established message is forwarded to the operator server via the wireless network controller.

In an eleventh aspect, an embodiment of the present invention provides a multimode terminal, including:

a first uplink data receiving unit, configured to receive uplink data of a terminal of a second mode;

a first uplink data forwarding unit, configured to forward the uplink data to a core network of the multimode terminal to enable the core network of the multimode terminal to forward the uplink data to a core network of the second mode corresponding to the terminal of the second mode, where a data transmission path is established between the core network of the multimode terminal and the core network of the second mode;

a first downlink data receiving unit, configured to receive downlink data forwarded by the core network of the multimode terminal, where the downlink data is sent by the core network of the second mode; and a first downlink data forwarding unit, configured to send the downlink data to the terminal of the second mode.

In a twelfth aspect, an embodiment of the present invention provides a core network of a multimode terminal, including;

a second uplink data receiving unit, configured to receive uplink data sent by a multimode terminal, where the uplink data is sent to the multimode terminal by a terminal of a second mode;

a second uplink data forwarding unit, configured to forward the uplink data to a core network of the second mode;

a second downlink data receiving unit, configured to receive downlink data sent by the core network of the second mode; and a second downlink data forwarding unit, configured to forward the downlink data to the multimode terminal to enable the multimode terminal to forward the downlink data to the terminal of the second mode.

The embodiments of the present invention provide a method a device and a system for establishing a virtual base station and transferring data. An operator server detects poor network coverage of a second mode and informs a wireless network controller of establishing a virtual base station so as to solve the problem; the wireless network controller informs a multimode terminal capable of being compatible with a second mode, of loading a virtual base station mirror of the second mode to generate a virtual base station, for a terminal of the second mode to get access to the virtual base station, to solve the problem of poor wireless network coverage; not only costs are reduced, but also an implementation process is simple. A method for transferring data by using a virtual base station solves a problem of poor network coverage of a second mode by transferring uplink and downlink data orderly; not only an implementation process is simple, but also deployment is flexible.

BRIEF DESCRIPTION OF DRAWINGS

In order to make technical solutions in embodiments of the present invention or the prior art more clearly, accompanying drawings used for description of the embodiments of the present invention or the prior art will be briefly described hereunder. Obviously, the described drawings are merely some embodiments of the present invention. For persons skilled in the art, other drawings may be obtained based on these drawings without any creative efforts.

DESCRIPTION OF EMBODIMENTS

Technical solutions in embodiments of the present invention are hereinafter described clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative efforts shall fall within the protection scope of the present invention.

Embodiment 1

Figure 1:
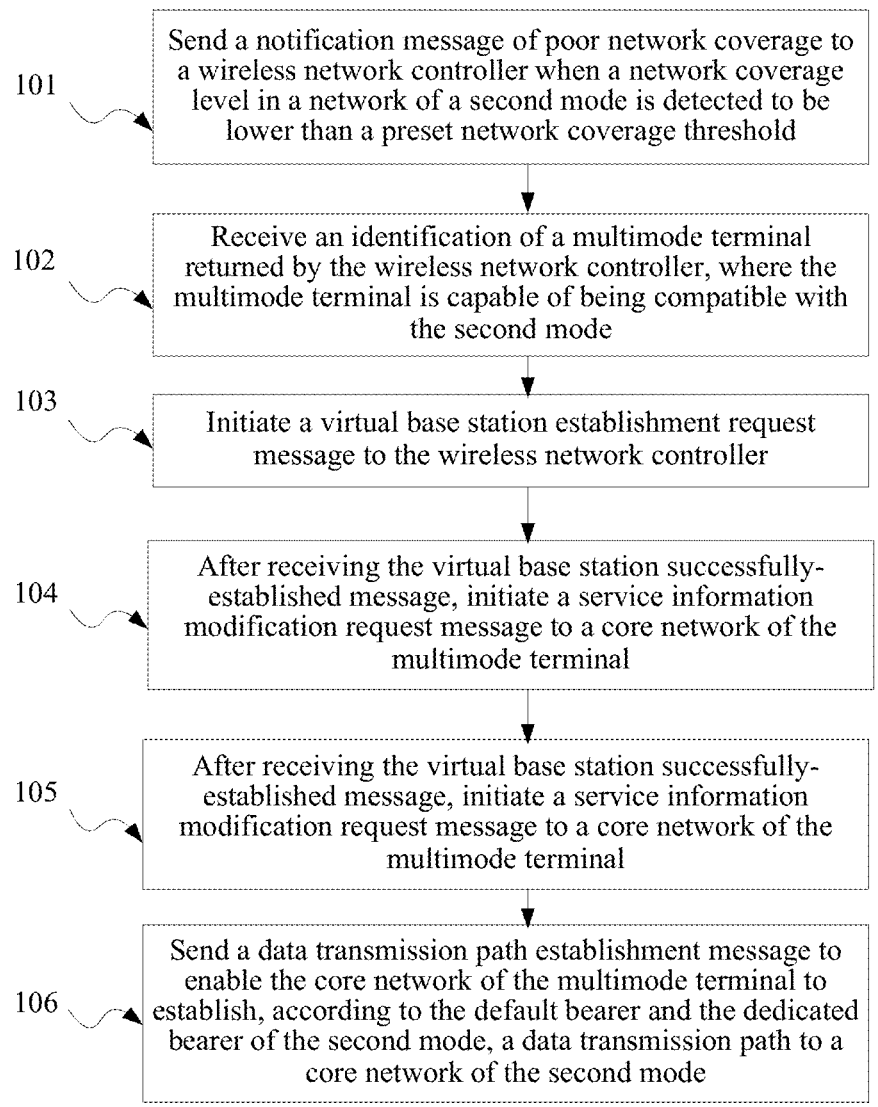
FIG. 1 is a flow chart of a method for establishing a virtual base station according to embodiment 1 of the present invention, relating to a side of an operator server.

The embodiment of the present invention provides a method for establishing a virtual base station, which relates to a side of an operator server, as shown in FIG. 1, including:

101. Send a notification message of poor network coverage to a wireless network controller when a network coverage level in a network of a second mode is detected to be lower than a preset network coverage threshold.

When a network coverage level of a second mode is detected to be lower than a network coverage threshold, an operator server sends a notification message which indicates that the network coverage level of a second mode is lower than the network coverage threshold, to the wireless network controller, moreover, the notification message of the poor network coverage includes information of a location where the network coverage level of the second mode is lower than the network coverage threshold and information of the second mode;

102. Receive an identification of a multimode terminal returned by the wireless network controller, where the multimode terminal is capable of being compatible with the second mode.

The operator server sends the notification message of poor coverage of a nearby network in the second mode to the wireless network controller, and meanwhile also sends the information of the location where the network coverage level of the second mode is lower than the network coverage threshold and the information of the second mode to the wireless network controller. The wireless network controller determines a multimode terminal capable of being compatible with the second mode according to the information of the location and the information of the second mode which are received, where the multimode terminal operates in a first mode, and then sends an identification of the multimode terminal to an operator to indicate that the multimode terminal capable of being compatible with the second mode has been found.

103. Initiate a virtual base station establishment request message to the wireless network controller.

After receiving the identification of the multimode terminal, the operator server initiates a virtual base station establishment request message to the wireless network controller, where the request message includes the identification of the multimode terminal and the information of the second mode, and the wireless network controller forwards, according to the identification of the multimode terminal, the virtual base station establishment request message to a multimode terminal corresponding to the identification, to enable the multimode terminal to generate a virtual machine and load a virtual base station mirror that is the same as the second mode to generate a virtual base station. After the virtual base station is established successfully, the multimode terminal operates in the second mode as a base station to solve the problem of poor coverage of the network of the second mode, meanwhile the multimode terminal also operates in the first mode to provide a path for the second mode.

104. Receive a virtual base station successfully-established message that is sent by the multimode terminal and forwarded by the wireless network controller.

After the virtual base station is established successfully, the multimode terminal sends a virtual base station successfully-established message to the wireless network controller, and then the wireless network controller sends the virtual base station successfully-established message to the operator server, and the virtual base station successfully-established message includes an identification of the virtual base station.

105. After receiving the virtual base station successfully-established message, initiate a service information modification request message to a core network of the multimode terminal.

After the operator server receives the virtual base station successfully-established message, the operator server sends a service information modification request message to a core network of the multimode terminal. The service information modification request message includes information of a default bearer, a dedicated bearer, charging and a bandwidth of the second mode, so as to satisfy a service requirement of at least one terminal of the second mode served by the virtual base station.

It should be noted that, each terminal of the second mode has its own information of the default bearer, the dedicated bearer, the charging and the bandwidth in the core network, in the embodiment of the present invention, if the number of the terminal of the second mode is one, then the default bearer, the dedicated bearer and the bandwidth in the request message are a default bearer, a dedicated bearer and a bandwidth of the one terminal of the second mode; if the number of the terminal of the second mode is multiple, then the default bearer, the dedicated bearer and the bandwidth in the request message are a sum of default bearers, a sum of dedicated bearers, and a sum of bandwidths of the multiple terminal of the second modes.

106. Send a data transmission path establishment message to enable the core network of the multimode terminal to establish, according to the default bearer and the dedicated bearer of the second mode, a data transmission path to a core network of the second mode.

After completing service information modification, the operator server sends a data transmission path establishment message to the core network of the multimode terminal to enable the core network of the multimode terminal to establish, according to the default bearer and the dedicated bearer of the second mode, a data transmission path to a core network of the second mode.

Figure 2:
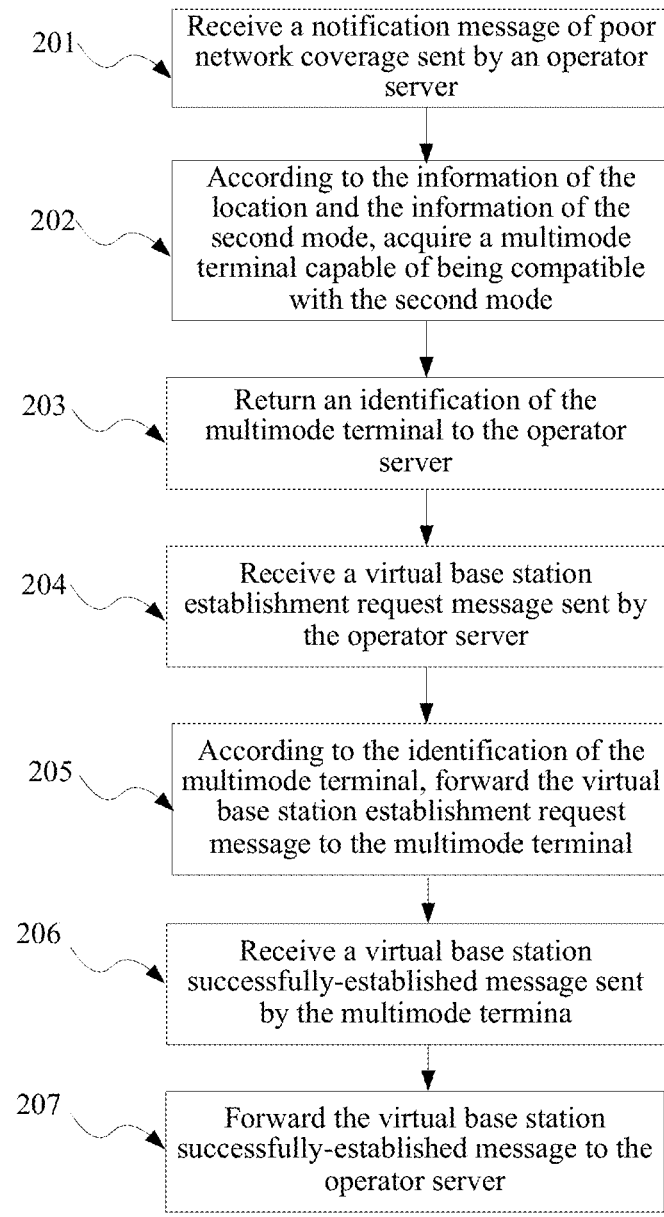
FIG. 2 is a flow chart of a method for establishing a virtual base station according to the embodiment 1 of the present invention, relating to a side of a wireless network controller.

The embodiment of the present invention further provides a method for establishing a virtual base station, which relates to a side of a wireless network controller, as shown in FIG. 2, including:

201. Receive a notification message of poor network coverage sent by an operator server.

When a network coverage level of a second mode is detected to be lower than a preset network coverage threshold, an operator server sends a wireless network controller a notification message indicating the network coverage level of the second mode is lower than the network coverage threshold, the wireless network controller receives this message, where the message also includes information of a location where the network coverage level of the second mode is lower than the network coverage threshold and information of the second mode.

202. According to the information of the location and the information of the second mode, acquire a multimode terminal capable of being compatible with the second mode.

203. Return an identification of the multimode terminal to the operator server.

After determining the multimode terminal capable of being compatible with the second mode, the wireless network controller returns an identification of the multimode terminal to the operator server to indicate that the multimode terminal capable of being compatible with the second mode has been found.

204. Receive a virtual base station establishment request message sent by the operator server.

After determination of the multimode terminal, the operator server sends a virtual base station establishment request to the wireless network controller, where the virtual base station establishment request includes the identification of the multimode terminal and the information of the second mode.

205. According to the identification of the multimode terminal, forward the virtual base station establishment request message to the multimode terminal.

206. Receive a virtual base station successfully-established message sent by the multimode terminal.

207. Forward the virtual base station successfully-established message to the operator server.

Figure 3:
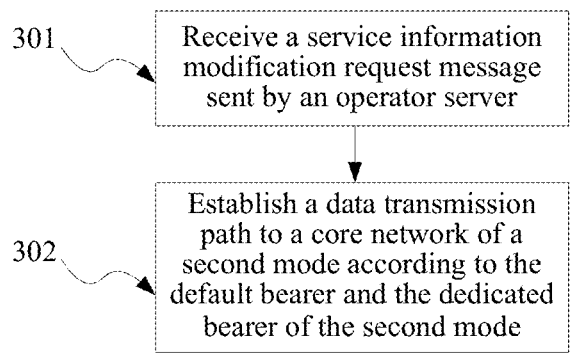
FIG. 3 is a flow chart of a method for establishing a virtual base station according to the embodiment 1 of the present invention, relating to a side of a core network of a multimode terminal.

The embodiment of the present invention further provides a method for establishing a virtual base station, which relates to a side of a core network of a multimode terminal, as shown in FIG. 3, including:

301. Receive a service information modification request message sent by an operator server.

The operator server sends a service information modification request message to a core network of a multimode terminal, where the service information modification request message includes information of a default bearer, a dedicated bearer, charging and a bandwidth of a second mode, so as to satisfy a service requirement of at least one terminal of the second mode served by the virtual base station.

302. Establish a data transmission path to a core network of a second mode according to the default bearer and the dedicated bearer of the second mode.

Figure 4:
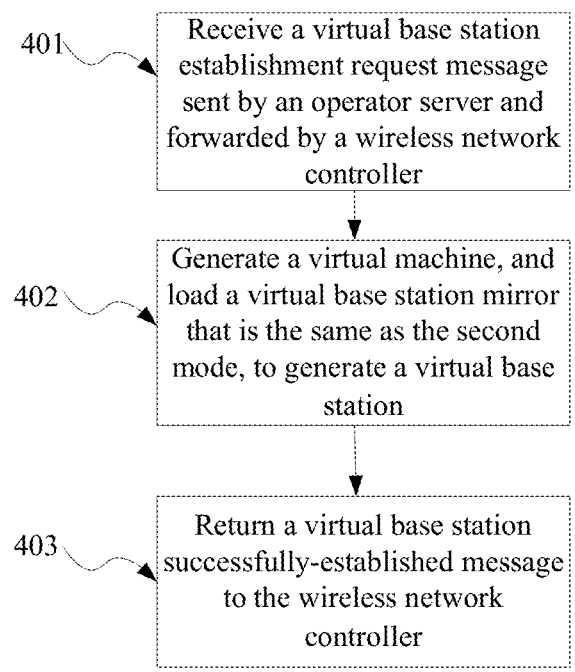
FIG. 4 is a flow chart of a method for establishing a virtual base station according to the embodiment 1 of the present invention, relating to a side of a multimode terminal.

The embodiment of the present invention further provides a method for establishing a virtual base station, which relates to a side of a multimode terminal, as shown in FIG. 4, including:

401. Receive a virtual base station establishment request message sent by an operator server and forwarded by a wireless network controller.

An operator server sends a virtual base station establishment request message to the wireless network controller, and the wireless network controller sends the request message to a multimode terminal, where the virtual base station establishment request message includes an identification of the multimode terminal and information of a second mode.

402. Generate a virtual machine, and load a virtual base station mirror that is the same as the second mode, to generate a virtual base station.

The multimode terminal generates a virtual machine, and loads, according to the identification of the multimode terminal and the information of the second mode that are carried in the virtual base station establishment request message, a virtual base station mirror that is the same as the second mode, to generate a virtual base station.

403. Return a virtual base station successfully-established message to the wireless network controller.

After establishing the virtual base station, the multimode terminal returns a virtual base station successfully-established message to the wireless network controller, where the message includes an identification of the established virtual base station.

The multimode terminal in the embodiment of the present invention may be compatible with a variety of communications modes. For instance, the multimode terminal performs signal reception and transmission in a UMTS (universal mobile telecommunications systems, universal mobile telecommunications systems) mode, and meanwhile the multimode terminal also takes a GSM (global system for mobile communications, global system for mobile communications) as a second mode, and supports communications of a GSM terminal by establishing a virtual base station of the GSM.

The embodiment of the present invention provides a method for establishing a virtual base station, when detecting that a network coverage level in a network of a second mode is lower than a preset network coverage threshold, an operator server sends a notification message of poor network coverage to a wireless network controller, where the sent notification message includes information of a location of the poor network coverage and information of the second mode; after receiving the notification message, the wireless network controller determines, according to the information of the location of the poor network coverage and the information of the second mode, a multimode terminal capable of being compatible with the second mode, and then sends an identification of the multimode terminal to the operator server; the operator server sends a virtual base station establishment request message to the wireless network controller, where the request message includes the identification of the multimode terminal and the information of the second mode; the wireless network controller forwards, according to the identification of the multimode terminal, the virtual base station establishment request message to a multimode terminal corresponding to the identification, the multimode terminal generates a virtual machine and load a virtual base station mirror that is the same as the second mode to generate a virtual base station; after the virtual base station is established successfully, the multimode terminal sends a virtual base station successfully-established message to the wireless network controller and the wireless network controller forwards the message to the operator server; the operator server, after receiving the message, initiates a service information modification request message to a core network of the multimode terminal; after service information modification is completed, the core network of the multimode terminal establishes a data transmission path to a core network of the second mode; after the virtual base station and the core network are configured, a connection is established between the multimode terminal and a terminal of the second mode.

Establishment of a virtual base station is achieved by performing the above steps of an operator server, a wireless network controller, a core network of a multimode terminal and the multimode terminal, and a problem of poor network coverage is solved via the virtual base station established, which has a low cost and flexible deployment.

Figure 5:
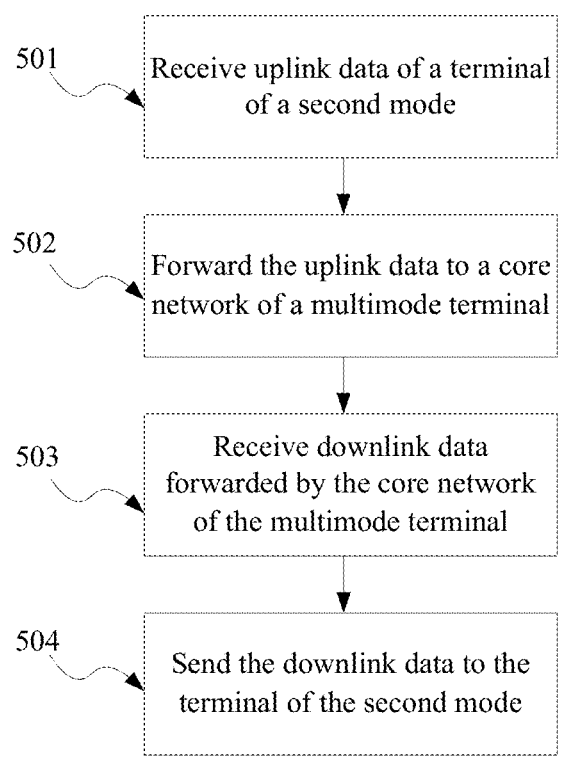
FIG. 5 is a flow chart of a method for transferring data according to the embodiment 1 of the present invention, relating to a side of a multimode terminal.

Furthermore, the embodiment of the present invention also provides a method for transferring data, which relates to a side of a multimode terminal, as shown in FIG. 5, including:

501. Receive uplink data of a terminal of a second mode.

502. Forward the uplink data to a core network of a multimode terminal.

A data transmission path is established between the core network of the multimode terminal and a core network of the second mode, the multimode terminal forwards uplink data to the core network of the multimode terminal to enable the core network of the multimode terminal to forward the uplink data to the core network of the second mode corresponding to the terminal of the second mode.

503. Receive downlink data forwarded by the core network of the multimode terminal.

The downlink data received by the multimode terminal is sent from the core network of the second mode.

504. Send the downlink data to the terminal of the second mode.

Figure 6:
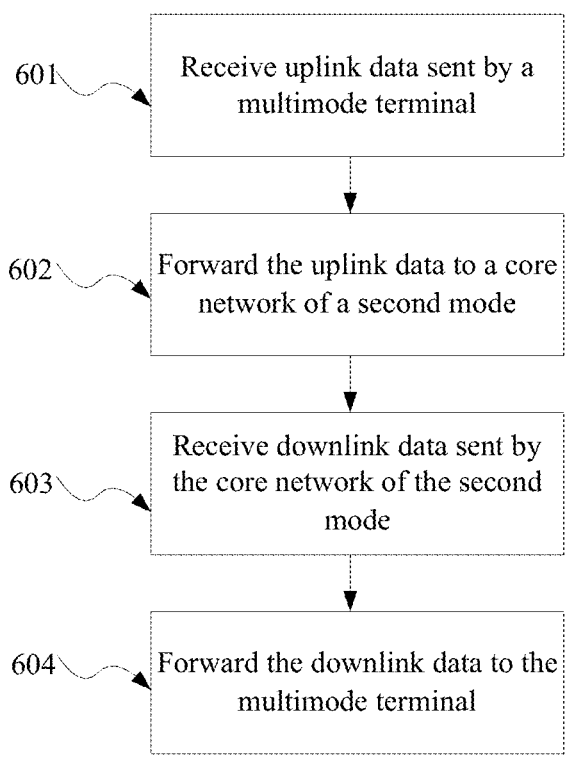
FIG. 6 is a flow chart of a method for transferring data according to the embodiment 1 of the present invention, relating to a side of a core network of a multimode terminal.

The embodiment of the present invention further provides a method for transferring data, which relates to a core network of a multimode terminal, as shown in FIG. 6, including:

601. Receive uplink data sent by a multimode terminal.

The uplink data received by the core network of the multimode terminal is sent by a terminal of a second mode to the multimode terminal, and then is sent by the multimode terminal to the core network of the multimode terminal.

602. Forward the uplink data to a core network of a second mode.

603. Receive downlink data sent by the core network of the second mode.

604. Forward the downlink data to the multimode terminal.

The core network of the multimode terminal forwards the downlink data to the multimode terminal and the multimode terminal forwards the downlink data to the terminal of the second mode.

According to a method for transferring uplink data provided by the embodiment of the present invention, firstly, a multimode terminal receives uplink data of a terminal of a second mode, the multimode terminal forwards the uplink data to a core network of the multimode terminal, and the core network, after receiving the uplink data, forwards the uplink data of the second mode to a core network of the second mode. According to a method for transferring downlink data, firstly, a core network of a multimode terminal receives downlink data sent by a core network of a second mode, the core network of the multimode terminal forwards the downlink data to the multimode terminal, and the multimode terminal, after receiving the downlink data, sends the downlink data to a terminal of the second mode.

Data transmission is achieved via the method for transferring data described above, and wireless network coverage in a specific area is achieved by transferring uplink and downlink data orderly, which has a simple implementation process and flexible deployment.

Embodiment 2

Figure 7:
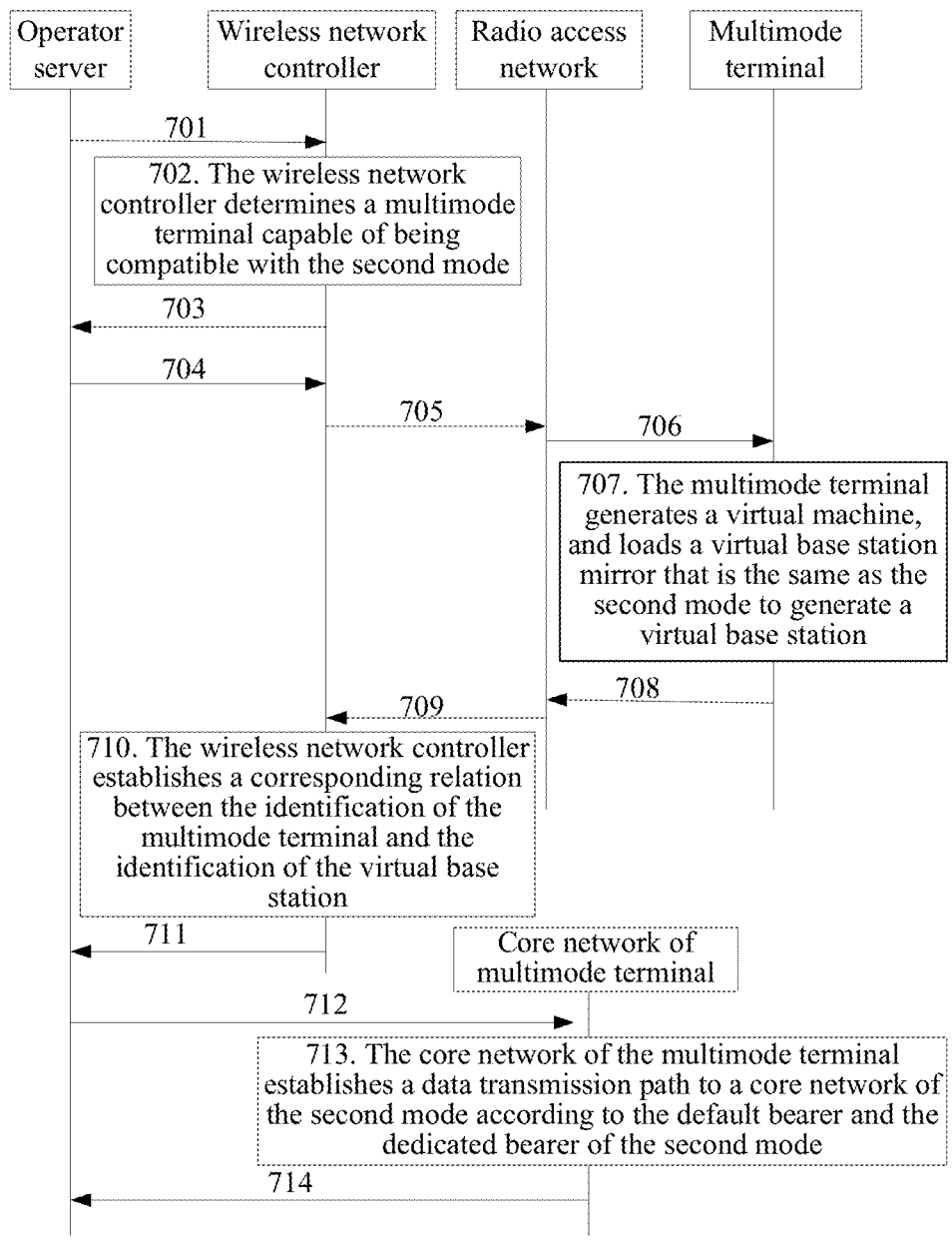
FIG. 7 is a flow chart of a method for establishing a virtual base station according to embodiment 2 of the present invention, relating to multiple sides.

The embodiment of the present invention provides a method for establishing a virtual base station, as shown in FIG. 7, the method includes:

701. An operator server sends a notification message of poor network coverage to a wireless network controller.

An operator server performs detection of network coverage level to a network of a second mode which is deployed by it, and when the network coverage level of the network of the second mode is detected to be lower than a preset network coverage threshold, sends a notification message of poor network coverage to a wireless network controller. The notification message of the poor network coverage includes information of a location where the network coverage level of the second mode is lower than the network coverage threshold and information of the second mode. For instance, if the network of the second mode is a GSM network, then the notification message of the poor network coverage should record a specific location lower than the network coverage threshold, and indicate that the network of the second mode lower than the network coverage threshold is the GSM network.

702. The wireless network controller determines a multimode terminal capable of being compatible with the second mode.

Specifically, the wireless network controller, after receiving the notification message of the poor network coverage, determines a multimode terminal capable of being compatible with the second mode according to the information of the location where the network coverage level of the second mode is lower than the network coverage threshold and the information of the second mode in the message.

Figure 8:
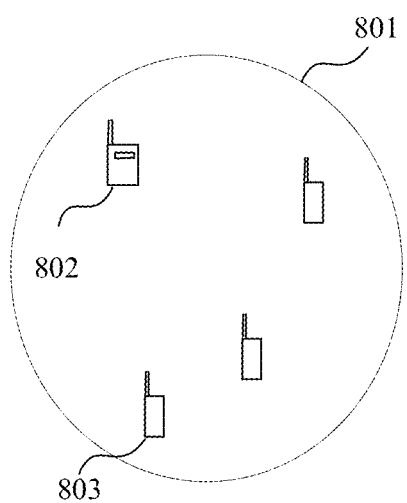
FIG. 8 is a diagram of a network mode according to the embodiment 2 of the present invention.

For instance, as shown in FIG. 8, 801 is an area where the network coverage level of the second mode is lower than the network coverage threshold, assuming that the second mode is GSM, then GSM terminals 803 within 801 are facing a problem of poor communications. A terminal 802 exists in 801, the terminal 802 operates in a non-GSM mode (such as a UMTS mode) by itself, and meanwhile the terminal 802 can also be compatible with a GSM mode. Then the wireless network controller determines the terminal 802 as a multimode terminal capable of being compatible with the second mode.

703. The wireless network controller returns an identification of the multimode terminal to the operator server.

704. The operator server initiates a virtual base station establishment request to the wireless network controller.

The operator server, after receiving the identification of the multimode terminal, initiates a virtual base station establishment request message to the wireless network controller. The request message includes the identification of the multimode terminal and the information of the second mode.

705. The wireless network controller forwards the virtual base station establishment request to a radio access network.

706. The radio access network forwards the virtual base station establishment request to the multimode terminal.

Since the virtual base station establishment request records the identification of the multimode terminal, thus the virtual base station establishment request message may be forwarded to a multimode terminal corresponding to the identification of the multimode terminal.

707. The multimode terminal generates a virtual machine, and loads a virtual base station mirror that is the same as the second mode to generate a virtual base station.

Since the virtual base station establishment request message includes the information of the second mode, thus the multimode terminal can load a virtual base station mirror that is the same as the second mode according to the information of the second mode. For instance, if the information of the second mode is a GSM mode, then the multimode terminal will load a virtual base station mirror of the GSM. In practical use, virtual base station mirrors of varieties of modes may be pre-stored in the multimode terminal so as to select a corresponding virtual base station mirror to load when the information of the second mode is received. The GSM is taken as an example for description herein, but it is not limited to the GSM, and may also be an LTE (long term evolution, long term evolution), a WIFI (wireless fidelity, wireless local area network), etc.

708. A virtual base station successfully-established message is sent to the radio access network.

The virtual base station successfully-established message carries an identification of the virtual base station.

709. The radio access network forwards the virtual base station successfully-established message to the wireless network controller.

710. The wireless network controller establishes a corresponding relation between the identification of the multimode terminal and the identification of the virtual base station.

711. The virtual base station successfully-established message is forwarded to the operator server.

712. The operator server initiates a service information modification request message to a core network of the multimode terminal.

After the operator server receives the virtual base station successfully-established message, the operator server sends a request of modification of service information in a core network of the multimode terminal, to the core network of the multimode terminal. The service information modification request message includes information of a default bearer, a dedicated bearer, charging and a bandwidth of the second mode, so as to satisfy a service requirement of at least one terminal of the second mode served by the virtual base station.

713. The core network of the multimode terminal establishes a data transmission path to a core network of the second mode according to the default bearer and the dedicated bearer of the second mode.

714. A success response is returned to the operator server after the data transmission path to the core network of the second mode is established.

Establishment of a virtual base station is completed via steps 701 to 714, and a problem of poor network coverage is solved via the virtual base station established, the above steps have a low cost and flexible deployment.

Figure 9:
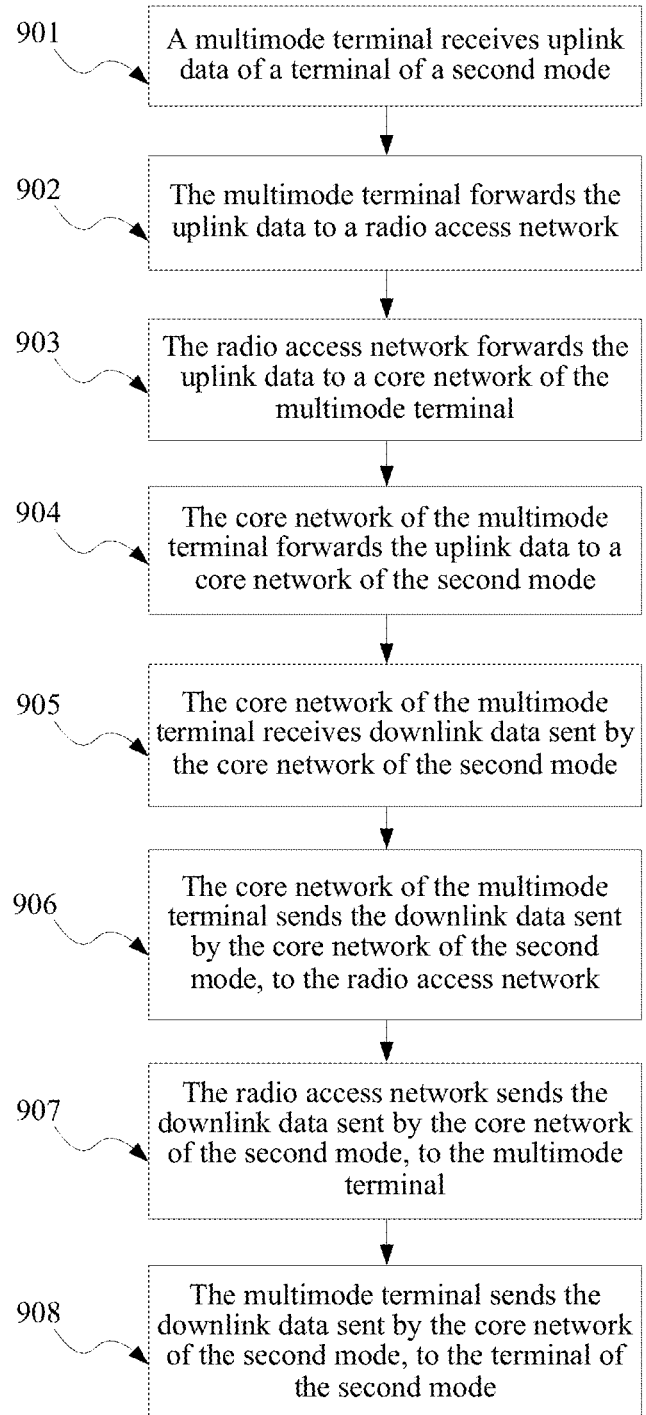
FIG. 9 is a flow chart of a method for transferring data by using a virtual base station according to the embodiment 2 of the present invention, relating to multiple sides.

After the establishment of the virtual base station is completed, the embodiment of the present invention also provides a method for transferring data by using a virtual base station, as shown in FIG. 9, including:

901. A multimode terminal receives uplink data of a terminal of a second mode.

902. The multimode terminal forwards the uplink data to a radio access network.

903. The radio access network forwards the uplink data to a core network of the multimode terminal.

904. The core network of the multimode terminal forwards the uplink data to a core network of the second mode.

A data transmission path is established between the core network of the multimode terminal and the core network of the second mode, the multimode terminal forwards the uplink data to the core network of the multimode terminal to enable the core network of the multimode terminal to forward the uplink data to the core network of the second mode corresponding to the terminal of the second mode.

905. The core network of the multimode terminal receives downlink data sent by the core network of the second mode.

The data transmission path is established between the core network of the multimode terminal and the core network of the second mode to enable the core network of the second mode to send the downlink data to the core network of the multimode terminal, and the core network of the multimode terminal to receive same.

906. The core network of the multimode terminal sends the downlink data sent by the core network of the second mode, to the radio access network.

907. The radio access network sends the downlink data sent by the core network of the second mode, to the multimode terminal.

908. The multimode terminal sends the downlink data sent by the core network of the second mode, to the terminal of the second mode.

Data transmission is achieved via the method for transferring data described above, and wireless network coverage in a specific area is achieved by transferring uplink and downlink data orderly, which has a simple implementation process and flexible deployment.

Figure 10:
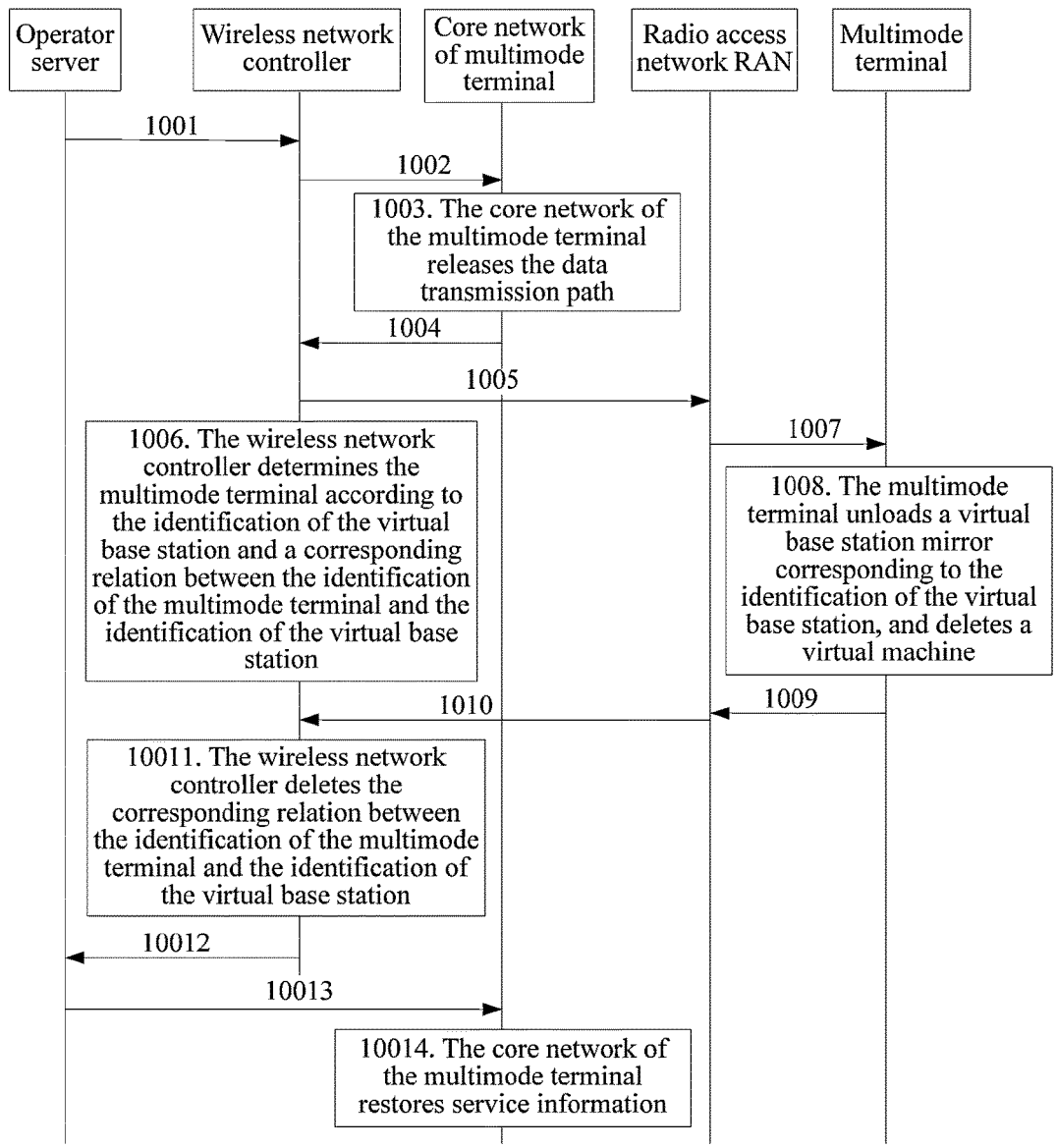
FIG. 10 is a flow chart of destroying a virtual base station according to the embodiment 2 of the present invention.

Furthermore, when the virtual base station does not need to be used any longer, the virtual base station may be deleted, as shown in FIG. 10, including:

1001. The operator server sends a virtual base station destruction request message to the wireless network controller.

After the virtual base station solves a problem of poor network coverage, the operator server sends a virtual base station destruction request message to the wireless network controller, where the virtual base station destruction request message includes the identification of the virtual base station.

1002. The wireless network controller sends a data transmission path release message to a core network of a multimode terminal.

The wireless network controller, after receiving the virtual base station destruction request message, sends a data transmission path release message to a core network of a multimode terminal, the data transmission path is established between the core network of the multimode terminal and a core network of a second mode when the virtual base station is established.

1003. The core network of the multimode terminal releases the data transmission path.

1004. The core network of the multimode terminal sends a data transmission path successfully-released message to the wireless network controller.

The core network of the multimode terminal, after releasing the data transmission path to the core network of the second mode, sends a successfully-released message to the wireless network controller.

1005, The wireless network controller sends a virtual base station deletion request message to a radio access network.

The wireless network controller sends a virtual base station deletion request message to a radio access network, and the message includes the identification of the virtual base station.

1006. The wireless network controller determines the multimode terminal according to the identification of the virtual base station and a corresponding relation between the identification of the multimode terminal and the identification of the virtual base station.

1007. The radio access network forwards the virtual base station deletion request message to the multimode terminal.

The virtual base station deletion request message sent by the radio access network carries the identification of the virtual base station.

1008. The multimode terminal unloads a virtual base station mirror corresponding to the identification of the virtual base station, and deletes a virtual machine.

1009. The multimode terminal returns a virtual base station successfully-deleted message to the radio access network.

10010. The radio access network forwards the virtual base station successfully-deleted message to the wireless network controller.

10011. The wireless network controller deletes the corresponding relation between the identification of the multimode terminal and the identification of the virtual base station.

10012. The wireless network controller forwards the virtual base station successfully-deleted message to the operator server.

10013. The operator server sends a service information restoration request message to the core network of the multimode terminal.

After receiving the virtual base station successfully-deleted message, the operator server sends a service information restoration request message to the core network of the multimode terminal, the service information restoration request message includes information of a default bearer, a dedicated bearer, charging and a bandwidth of a first mode, so as to satisfy a service requirement of the multimode terminal in the first mode.

10014. The core network of the multimode terminal restores service information.

After receiving the service information restoration request message sent by the operator server, the core network of the multimode terminal restores the service information that is modified when the virtual base station is established, so as to satisfy a service requirement of the multimode terminal in the first mode.

Steps 1001 to 10014 are steps for destroying a virtual base station, after the virtual base station completes its mission, the virtual base station is destroyed, which not only releases an unnecessary bearer, but also has a simple implementation process.

Embodiment 3

Figure 11:
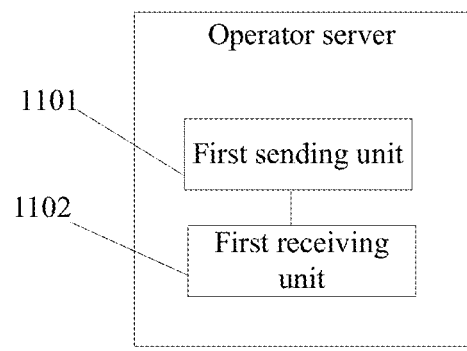
FIG. 11 is a block diagram of an operator server according to embodiment 3 of the present invention.

The embodiment of the present invention provide an operator server, as shown in FIG. 11, including:

A first sending unit 1101, configured to, send a notification message of poor network coverage to a wireless network controller when a network coverage level in a network of a second mode is detected to be lower than a preset network coverage threshold, where the notification message of the poor network coverage includes information of a location where the network coverage level of the second mode is lower than the network coverage threshold and information of the second mode.

A first receiving unit 1102, configured to receive an identification of a multimode terminal returned by the wireless network controller, where the multimode terminal is capable of being compatible with the second mode and operates in a first mode, and the multimode terminal is acquired by the wireless network controller according to the information of the location and the information of the second mode.

The first sending unit 1101 is further configured to initiate a virtual base station establishment request message to the wireless network controller, where the virtual base station establishment request message includes the identification of the multimode terminal and the information of the second mode; the wireless network controller forwards the virtual base station establishment request message to the multimode terminal according to the identification of the multimode terminal, to enable the multimode terminal to generate a virtual machine and load a virtual base station mirror that is the same as the second mode to generate a virtual base station.

The first receiving unit 1102 is further configured to receive a virtual base station successfully-established message that is sent by the multimode terminal and forwarded by the wireless network controller, where the virtual base station successfully-established message includes an identification of the virtual base station.

The first sending unit 1101 is further configured to, after receiving the virtual base station successfully-established message, initiate a service information modification request message to a core network of the multimode terminal, where the service information modification request message includes information of a default bearer, a dedicated bearer, charging and a bandwidth of the second mode, so as to satisfy a service requirement of at least one terminal of the second mode served by the virtual base station.

The first sending unit 1101 is further configured to, after completing service information modification, send a data transmission path establishment message to enable the core network of the multimode terminal to establish a data transmission path to a core network of the second mode according to the default bearer and the dedicated bearer of the second mode.

Furthermore, the first sending unit 1101 is further configured to send a virtual base station destruction request message to the wireless network controller, where the virtual base station destruction request message includes the identification of the virtual base station, so that the wireless network controller instructs the core network of the multimode terminal to release the data transmission path to the core network of the second mode, and instructs the multimode terminal to destroy the virtual base station.

The first receiving unit 1102 is further configured to receive a virtual base station successfully-deleted message forwarded by the wireless network controller, where the virtual base station successfully-deleted message is sent by the multimode terminal to the wireless network controller after the virtual base station is destroyed.

The first sending unit 1101 is further configured to send a service information restoration request message to the core network of the multimode terminal, where the service information restoration request message includes information of a default bearer, a dedicated bearer, charging and a bandwidth of the first mode, so as to satisfy a service requirement of the multimode terminal in the first mode.

Figure 12:
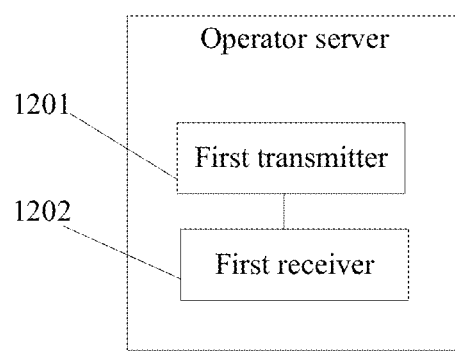
FIG. 12 is a block diagram of another operator server according to the embodiment 3 of the present invention.

The embodiment of the present invention also provides an operator server, as shown in FIG. 12, further including:

A first transmitter 1201, configured to send a notification message of poor network coverage to a wireless network controller when a network coverage level in a network of a second mode is detected to be lower than a preset network coverage threshold, where the notification message of the poor network coverage includes information of a location where the network coverage level of the second mode is lower than the network coverage threshold and information of the second mode.

A first receiver 1202, configured to receive an identification of a multimode terminal returned by the wireless network controller, where the multimode terminal is capable of being compatible with the second mode and operates in a first mode, and the multimode terminal is acquired by the wireless network controller according to the information of the location and the information of the second mode.

The first transmitter 1201 is further configured to initiate a virtual base station establishment request message to the wireless network controller, where the virtual base station establishment request message includes the identification of the multimode terminal and the information of the second mode; the wireless network controller forwards the virtual base station establishment request message to the multimode terminal according to the identification of the multimode terminal, to enable the multimode terminal to generate a virtual machine and load a virtual base station mirror that is the same as the second mode to generate a virtual base station.

The first receiver 1202 is further configured to receive a virtual base station successfully-established message that is sent by the multimode terminal and forwarded by the wireless network controller, where the virtual base station successfully-established message includes an identification of the virtual base station.

The first transmitter 1201 is further configured to, after receiving the virtual base station successfully-established message, initiate a service information modification request message to a core network of the multimode terminal, where the service information modification request message includes information of a default bearer, a dedicated bearer, charging and a bandwidth information of the second mode, so as to satisfy a service requirement of at least one terminal of the second mode served by the virtual base station.

Additionally, the first transmitter 1201 is further configured to, after service information modification is completed, send a data transmission path establishment message to enable the core network of the multimode terminal to establish a data transmission path to a core network of the second mode according to the default bearer and the dedicated bearer of the second mode.

Furthermore, the first receiver 1202 is further configured to receive a virtual base station successfully-deleted message forwarded by the wireless network controller, where the virtual base station successfully-deleted message is sent by the multimode terminal to the wireless network controller after the virtual base station is destroyed.

The first transmitter 1201 is further configured to send a service information restoration request message to the core network of the multimode terminal, where the service information restoration request message includes information of a default bearer, a dedicated bearer, charging and a bandwidth of the first mode, so as to satisfy a service requirement of the multimode terminal in the first mode.

Figure 13:
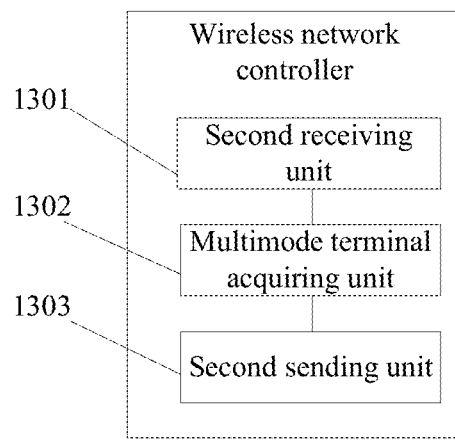
FIG. 13 is a block diagram of a wireless network controller according to the embodiment 3 of the present invention.

The embodiment of the present invention provides a wireless network controller, as shown in FIG. 13, including:

A second receiving unit 1301, configured to receive a notification message of poor network coverage sent by an operator server, where the notification message of the poor network coverage is sent by the operator server when a network coverage level in a network of a second mode is detected to be lower than a preset network coverage threshold, and includes information of a location where the network coverage level of the second mode is lower than the network coverage threshold and information of the second mode.

A multimode terminal acquiring unit 1302, configured to acquire, according to the information of the location and the information of the second mode, a multimode terminal capable of being compatible with the second mode.

A second sending unit 1303, configured to return an identification of the multimode terminal to the operator server.

The second receiving unit 1301 is further configured to receive a virtual base station establishment request message sent by the operator server, where the virtual base station establishment request message includes the identification of the multimode terminal and the information of the second mode.

The second sending unit 1303 is further configured to forward, according to the identification of the multimode terminal, the virtual base station establishment request message to the multimode terminal, to enable the multimode terminal to generate a virtual machine and load a virtual base station mirror that is the same as the second mode to generate a virtual base station.

The second receiving unit 1301 is further configured to receive a virtual base station successfully-established message sent by the multimode terminal, where the virtual base station successfully-established message includes an identification of the virtual base station.

The second sending unit 1303 is further configured to forward the virtual base station successfully-established message to the operator server.

The second sending unit 1303 is further configured to send the virtual base station establishment request message to a radio access network RAN, and the RAN forwards the virtual base station establishment request message to the multimode terminal.

The second receiving unit 1301 is further configured to receive the virtual base station successfully-established message sent by the multimode terminal and forwarded by the RAN.

Figure 14:
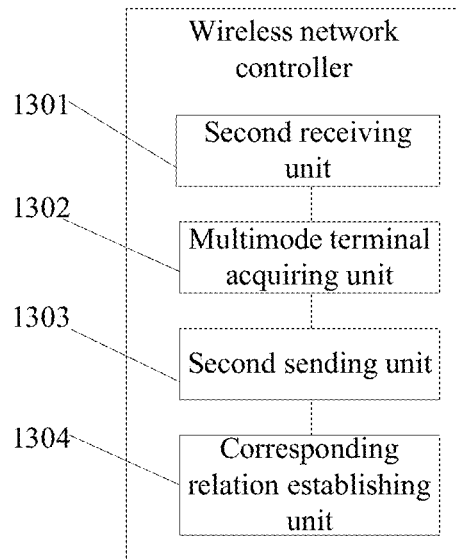
FIG. 14 is a block diagram of another wireless network controller according to the embodiment 3 of the present invention.

The embodiment of the present invention provides a wireless network controller, as shown in FIG. 14, further including:

A corresponding relation establishing unit 1304, configured to establish a corresponding relation between the identification of the multimode terminal and the identification of the virtual base station.

Figure 15:
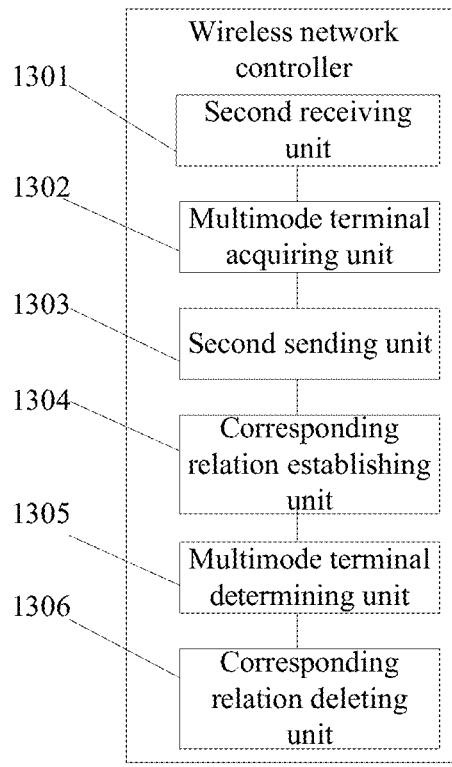
FIG. 15 is a block diagram of another wireless network controller according to the embodiment 3 of the present invention.

Furthermore, in the wireless network controller as shown in FIG. 15, the second receiving unit 1301 is further configured to receive a virtual base station destruction request message sent by the operator server, where the virtual base station destruction request message includes the identification of the virtual base station.

The second sending unit 1303 is further configured to send a data transmission path release message to a core network of the multimode terminal so as to release a data transmission path to a core network of the second mode.

The second receiving unit 1301 is further configured to receive a successfully-released message returned by the core network of the multimode terminal.

The wireless network controller further includes a multimode terminal determining unit 1305, configured to determine the multimode terminal according to the identification of the virtual base station and the corresponding relation between the identification of the multimode terminal and the virtual base station.

The second sending unit 1303 is further configured to send a virtual base station deletion request message to the RAN to enable the RAN to forward the virtual base station deletion request message to the multimode terminal, where the virtual base station deletion request message includes the identification of the virtual base station.

The second receiving unit 1301 is further configured to receive a virtual base station successfully-deleted message sent by the multimode terminal and forwarded by the RAN, where the virtual base station successfully-deleted message is sent by the multimode terminal after a virtual base station mirror corresponding to the identification of the virtual base station is unloaded and the virtual machine is deleted.

A corresponding relation deleting unit 1306, configured to delete the corresponding relation between the identification of the multimode terminal and the identification of the virtual base station.

The second sending unit 1303 is further configured to forward the virtual base station successfully-deleted message to the operator server.

Figure 16:
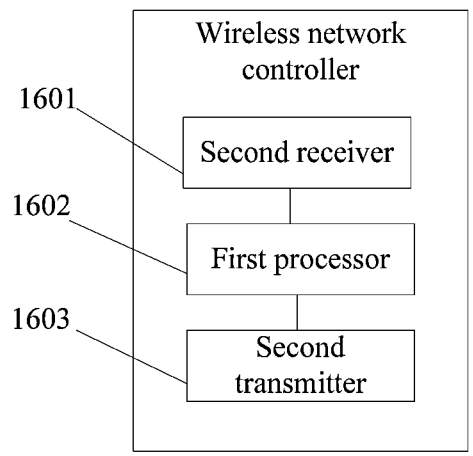
FIG. 16 is a block diagram of another wireless network controller according to the embodiment 3 of the present invention.

Furthermore, the embodiment of the present invention also provides a wireless network controller, as shown in FIG. 16, further including:

A second receiver 1601, configured to receive a notification message of poor network coverage sent by an operator server, where the notification message of the poor network coverage is sent by the operator server when a network coverage level in a network of a second mode is detected to be lower than a preset network coverage threshold, and includes information of a location where the network coverage level of the second mode is lower than the network coverage threshold and information of the second mode.

A first processor 1602, configured to acquire, according to the information of the location and the information of the second mode, a multimode terminal capable of being compatible with the second mode.

A second transmitter 1603, configured to return an identification of the multimode terminal to the operator server.

The second receiver 1601 is further configured to receive a virtual base station establishment request message sent by the operator server, where the virtual base station establishment request message includes the identification of the multimode terminal and the information of the second mode.

The second transmitter 1603 is further configured to forward, according to the identification of the multimode terminal, the virtual base station establishment request message to the multimode terminal, to enable the multimode terminal to generate a virtual machine and load a virtual base station mirror that is the same as the second mode to generate a virtual base station.

The second receiver 1601 is further configured to receive a virtual base station successfully-established message sent by the multimode terminal, where the virtual base station successfully-established message includes an identification of the virtual base station.

The second transmitter 1603 is further configured to forward the virtual base station successfully-established message to the operator server.

Additionally, the second transmitter 1603 is further configured to send the virtual base station establishment request message to a radio access network, and the virtual base station establishment request message is forwarded by the RAN to the multimode terminal.

The second receiver 1601 is further configured to receive the virtual base station successfully-established message sent by the multimode terminal and forwarded by the RAN.

The first processor 1602 is further configured to establish a corresponding relation between the identification of the multimode terminal and the identification of the virtual base station.

The second receiver 1601 is further configured to receive a virtual base station destruction request message sent by the operator server, where the virtual base station destruction request message includes the identification of the virtual base station.

The second transmitter 1603 is further configured to send a data transmission path release message to a core network of the multimode terminal so as to release a data transmission path to a core network of the second mode.

The second receiver 1601 is further configured to receive a successfully-released message returned by the core network of the multimode terminal.

The first processor 1602 is further configured to determine the multimode terminal according to the identification of the virtual base station and the corresponding relation between the identification of the multimode terminal and the virtual base station.

The second transmitter 1603 is further configured to send a virtual base station deletion request message to the RAN to enable the RAN to forward the virtual base station deletion request message to the multimode terminal, where the virtual base station deletion request message includes the identification of the virtual base station.

The second receiver 1601 is further configured to receive a virtual base station successfully-deleted message sent by the multimode terminal and forwarded by the RAN, where the virtual base station successfully-deleted message is sent by the multimode terminal after a virtual base station mirror corresponding to the identification of the virtual base station is unloaded and the virtual machine is deleted.

The first processor 1602 is further configured to delete the corresponding relation between the identification of the multimode terminal and the identification of the virtual base station.

The second transmitter 1603 is further configured to forward the virtual base station successfully-deleted message to the operator server.

Figure 17:
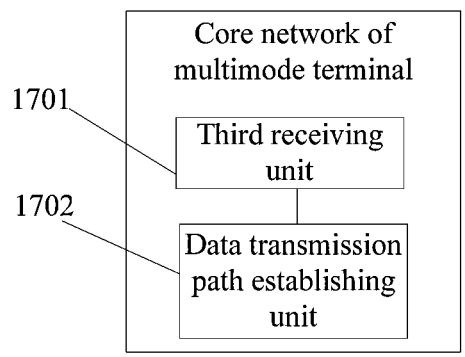
FIG. 17 is a block diagram of a core network of a multimode terminal according to the embodiment 3 of the present invention.

The embodiment of the present invention provides a core network of a multimode terminal, as shown in FIG. 17, including:

A third receiving unit 1701, configured to receive a service information modification request message sent by an operator server, where the service information modification request message includes information of a default bearer, a dedicated bearer, charging and a bandwidth of a second mode, so as to satisfy a service requirement of at least one terminal of the second mode served by the virtual base station and broaden a data transmission path between the core network of the multimode terminal and a core network of the second mode.

A data transmission path establishing unit 1702, configured to establish the data transmission path to the core network of the second mode according to the default bearer and the dedicated bearer of the second mode.

Figure 18:
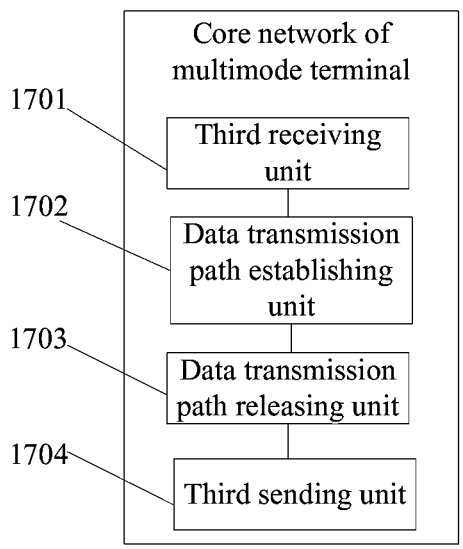
FIG. 18 is a block diagram of another core network of a multimode terminal according to the embodiment 3 of the present invention.

Furthermore, in the core network of the multimode terminal as shown in FIG. 18, the third receiving unit 1701 is further configured to receive a data transmission path release message sent by a wireless network controller.

The core network of the multimode terminal further includes a data transmission path releasing unit 1703, which is configured to release the data transmission path to the core network of the second mode.

A third sending unit 1704, configured to send a successfully-released message to the wireless network controller.

The third receiving unit 1701 is further configured to receive a service information restoration request message sent by the operator server, where the service information restoration request message includes information of a default bearer, a dedicated bearer, charging and a bandwidth of a first mode, so as to satisfy a service requirement of the multimode terminal in the first mode.

Figure 19:
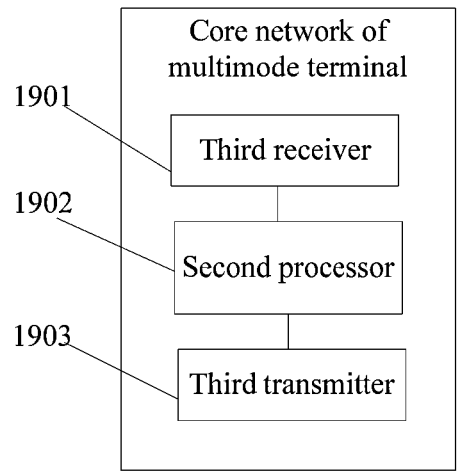
FIG. 19 is a block diagram of another core network of a multimode terminal according to the embodiment 3 of the present invention.

Furthermore, the embodiment of the present invention also provides a core network of a multimode terminal, as shown in FIG. 19, including:

A third receiver 1901, configured to receive a service information modification request message sent by an operator server, where the service information modification request message includes information of a default bearer, a dedicated bearer, charging and a bandwidth of a second mode, so as to satisfy a service requirement of at least one terminal of the second mode served by the virtual base station.

A second processor 1902, configured to establish a data transmission path to a core network of the second mode according to the default bearer and the dedicated bearer of the second mode.

The second processor 1902 is further configured to release the data transmission path to the core network of the second mode.

A third transmitter 1903, configured to send a successfully-released message to the wireless network controller.

The third receiver 1901 is further configured to receive a service information restoration request message sent by the operator server, where the service information restoration request message includes information of a default bearer, a dedicated bearer, charging and a bandwidth of a first mode, so as to satisfy a service requirement of the multimode terminal in the first mode.

Figure 20:
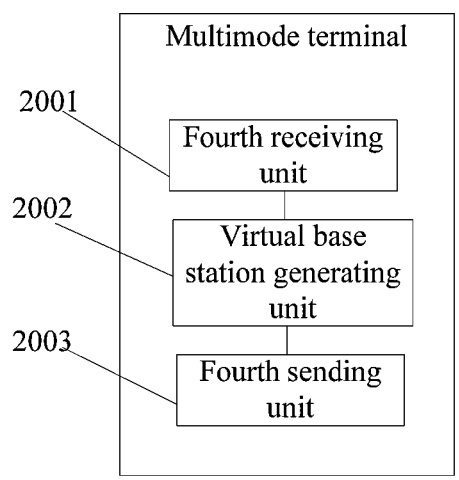
FIG. 20 is a block diagram of a multimode terminal according to the embodiment 3 of the present invention.

The embodiment of the present invention provides a multimode terminal, as shown in FIG. 20, including:

A fourth receiving unit 2001, configured to receive a virtual base station establishment request message sent by an operator server and forwarded by a wireless network controller, where the virtual base station establishment request message includes an identification of a multimode terminal and information of a second mode.

A virtual base station generating unit 2002, configured to generate a virtual machine, and load a virtual base station mirror that is the same as the second mode to generate a virtual base station.

A fourth sending unit 2003, configured to return a virtual base station successfully-established message to the wireless network controller, where the virtual base station successfully-established message includes an identification of the virtual base station, and the virtual base station successfully-established message is forwarded to the operator server via the wireless network controller.

Figure 21:
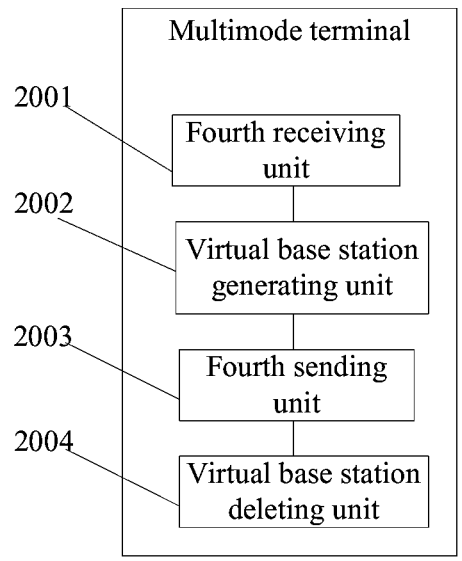
FIG. 21 is a block diagram of another multimode terminal according to the embodiment 3 of the present invention.

Furthermore, in the multimode terminal as shown in FIG. 21, the fourth receiving unit 2001 is further configured to receive a virtual base station deletion request message sent by the wireless network controller and forwarded by a radio access network, where the virtual base station deletion request message includes the identification of the virtual base station.

The multimode terminal further includes a virtual base station deleting unit 2004, configured to unload a virtual base station mirror corresponding to the identification of the virtual base station and delete the virtual machine.

The fourth receiving unit 2001 is further configured to return a virtual base station successfully-deleted message to the RAN, where the virtual base station successfully-deleted message is forwarded by the RAN to the wireless network controller, and is forwarded by the wireless network controller to the operator server.

Figure 22:
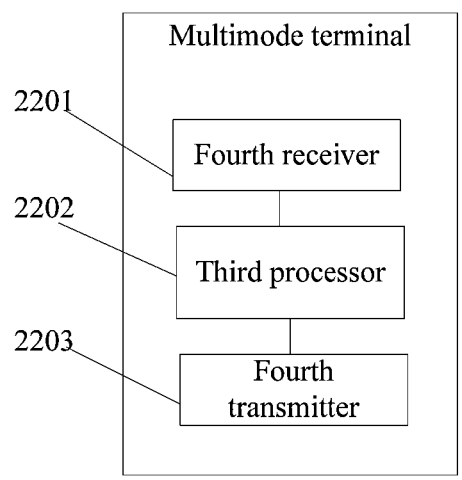
FIG. 22 is a block diagram of another multimode terminal according to the embodiment 3 of the present invention.

Furthermore, the embodiment of the present invention also provides a multimode terminal, as shown in FIG. 22, including:

A fourth receiver 2201, configured to receive a virtual base station establishment request message sent by an operator server and forwarded by a wireless network controller, where the virtual base station establishment request message includes an identification of a multimode terminal and information of a second mode.

A third processor 2202, configured to generate a virtual machine, and load a virtual base station mirror that is the same as the second mode to generate a virtual base station.

A fourth transmitter 2203, configured to return a virtual base station successfully-established message to the wireless network controller, where the virtual base station successfully-established message includes an identification of the virtual base station, and the virtual base station successfully-established message is forwarded to the operator server via the wireless network controller.

The fourth receiver 2201 is further configured to receive a virtual base station deletion request message sent by the wireless network controller and forwarded by a radio access network RAN, where the virtual base station deletion request message includes the identification of the virtual base station.

The third processor 2202 is further configured to unload a virtual base station mirror corresponding to the identification of the virtual base station and delete the virtual machine.

The fourth receiver 2201 is further configured to return a virtual base station successfully-deleted message to the RAN, where the virtual base station successfully-deleted message is forwarded by the RAN to the wireless network controller, and is forwarded by the wireless network controller to the operator server.

Establishment of a virtual base station is achieved through performing corresponding actions by an operator server, a wireless network controller, a core network of a multimode terminal and the multimode terminal that include the above units, and a problem of poor network coverage is solved via the virtual base station established, which has a low cost and flexible deployment.

Figure 23:
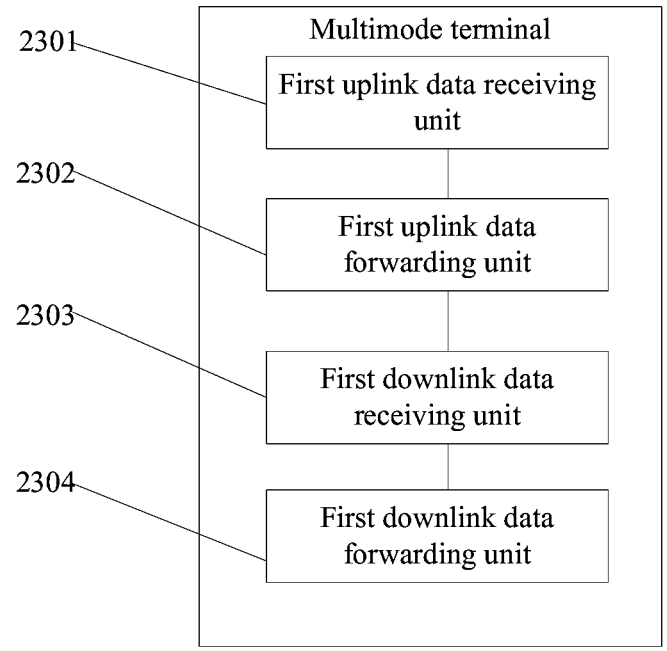
FIG. 23 is a block diagram of another multimode terminal according to the embodiment 3 of the present invention.

In order to achieve data reception and transmission, the embodiment of the present invention provides a multimode terminal, as shown in FIG. 23, including:

A first uplink data receiving unit 2301, configured to receive uplink data of a terminal of a second mode.

A first uplink data forwarding unit 2302, configured to forward the uplink data to a core network of the multimode terminal, to enable the core network of the multimode terminal to forward the uplink data to a core network of the second mode corresponding to the terminal of the second mode, where a data transmission path is established between the core network of the multimode terminal and the core network of the second mode.

A first downlink data receiving unit 2303, configured to receive downlink data forwarded by the core network of the multimode terminal, where the downlink data is sent by the core network of the second mode.

A first downlink data forwarding unit 2304, configured to send the downlink data to the terminal of the second mode.

Figure 24:
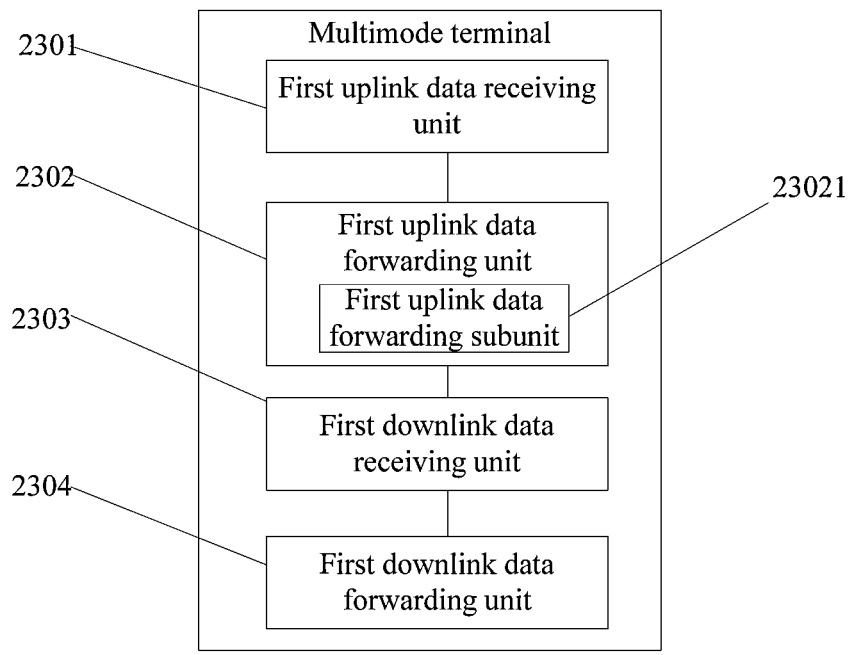
FIG. 24 is a block diagram of another multimode terminal according to the embodiment 3 of the present invention.

Furthermore, the embodiment of the present invention provides a multimode terminal, as shown in FIG. 24, the first uplink data forwarding unit 2302 includes:

A first uplink data forwarding subunit 23021, configured to forward the uplink data to a radio access network, and forward same to the core network of the multimode terminal via the radio access network.

Figure 25:
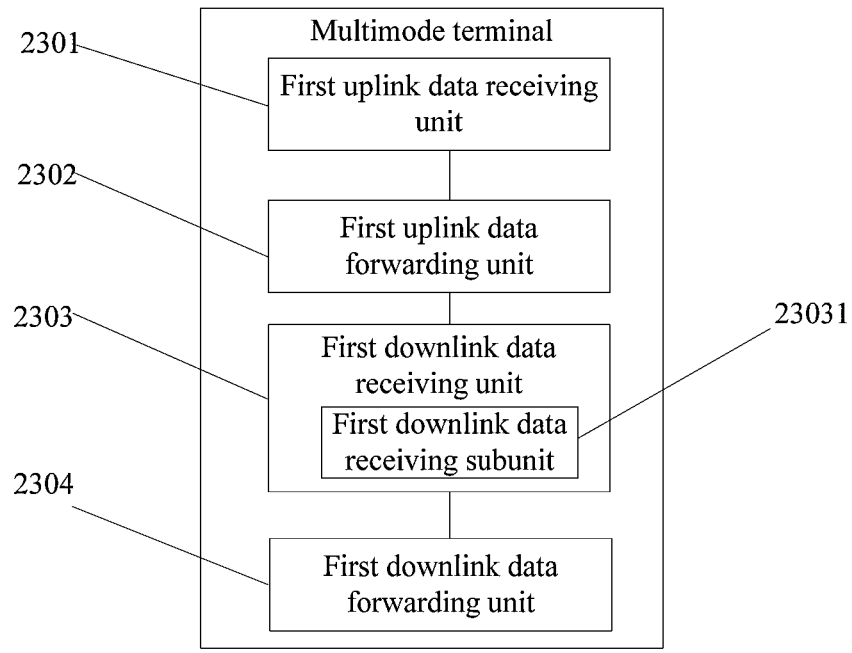
FIG. 25 is a block diagram of another multimode terminal according to the embodiment 3 of the present invention.

The embodiment of the present invention provides a multimode terminal, as shown in FIG. 25, the first downlink data receiving unit 2303 includes:

A first downlink data receiving subunit 23031, configured to receive, via the radio access network, the downlink data forwarded by the core network of the multimode terminal.

Figure 26:
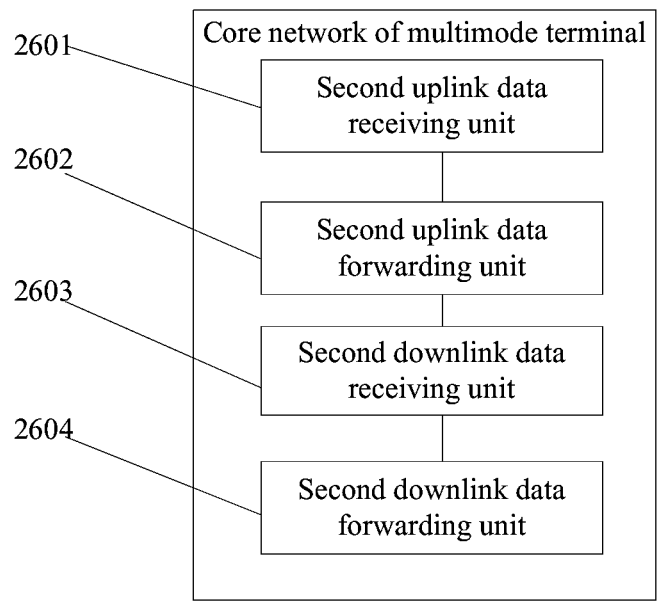
FIG. 26 is a block diagram of a core network of a multimode terminal according to the embodiment 3 of the present invention.

The embodiment of the present invention provides a core network of a multimode terminal, as shown in FIG. 26, including:

A second uplink data receiving unit 2601, configured to receive uplink data sent by a multimode terminal, where the uplink data is sent to the multimode terminal by a terminal of a second mode.

A second uplink data forwarding unit 2602, configured to forward the uplink data to a core network of the second mode.

A second downlink data receiving unit 2603, configured to receive downlink data sent by the core network of the second mode.

A second downlink data forwarding unit 2604, configured to forward the downlink data to the multimode terminal, to enable the multimode terminal to forward the downlink data to the terminal of the second mode.

Figure 27:
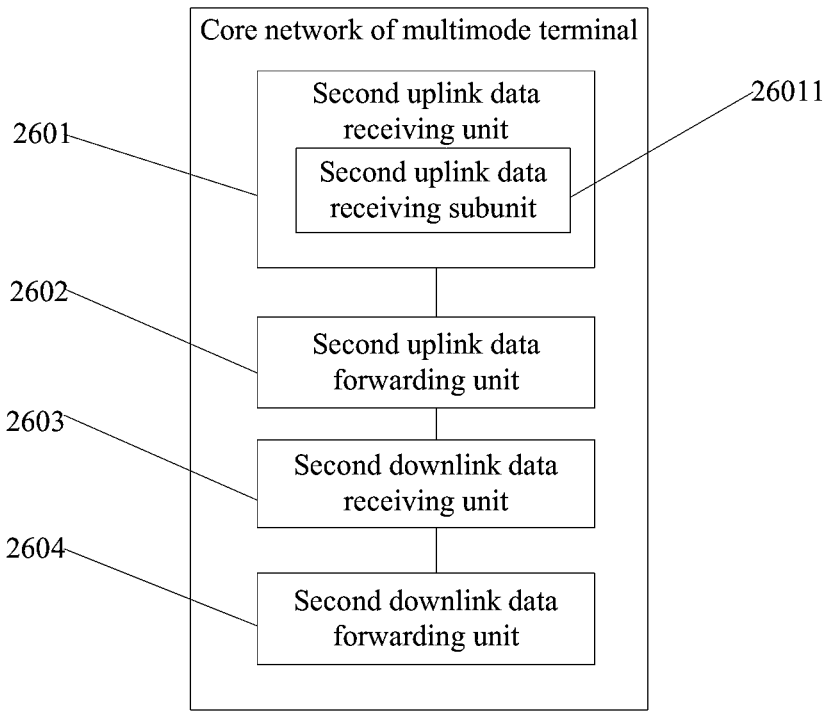
FIG. 27 is a block diagram of another core network of a multimode terminal according to the embodiment 3 of the present invention.

The embodiment of the present invention provides a core network of a multimode terminal, as shown in FIG. 27, the second uplink data receiving unit 2601 includes:

A second uplink data receiving subunit 26011, configured to receive, via a radio access network, the uplink data sent by the multimode terminal.

Figure 28:
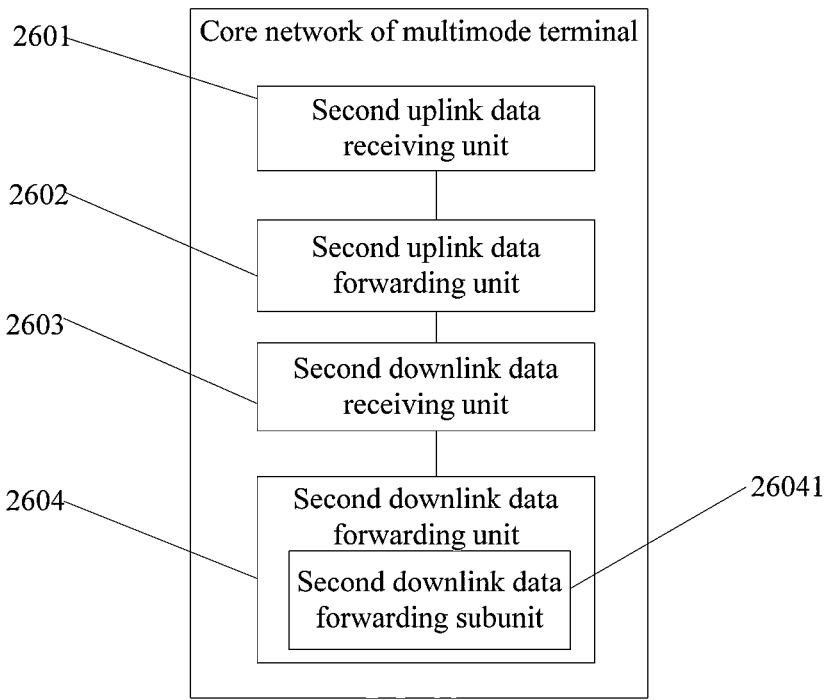
FIG. 28 is a block diagram of another core network of a multimode terminal according to the embodiment 3 of the present invention.

The embodiment of the present invention provides a core network of a multimode terminal, as shown in FIG. 28, the second downlink data forwarding unit 2604 includes:

A second downlink data forwarding subunit 26041, configured to forward the downlink data packet to the radio access network, to enable the radio access network to send the downlink data packet to the multimode terminal.

Data transmission is achieved via the method for transferring data described above, and wireless network coverage in a specific area is achieved by transferring uplink and downlink data orderly, which has a simple implementation process and flexible deployment.

Figure 29:
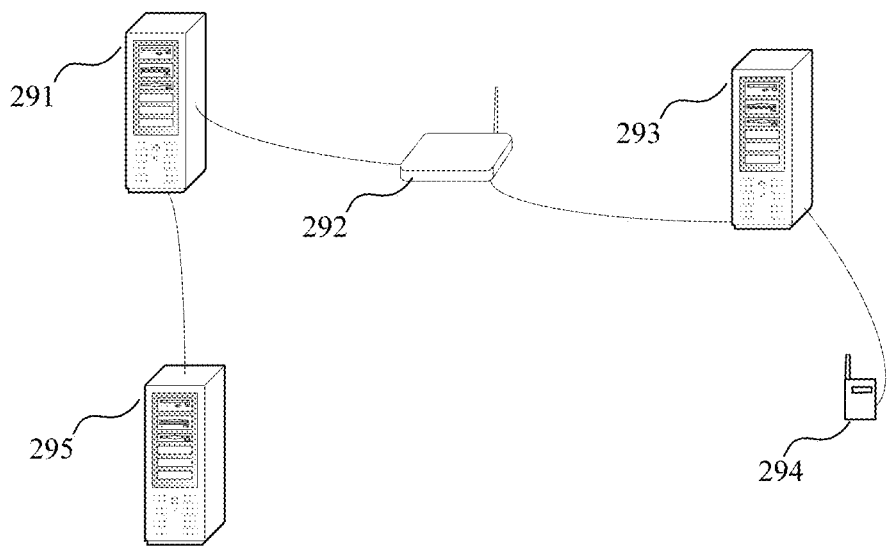
FIG. 29 is a diagram of a system for establishing a virtual base station according to the embodiment 3 of the present invention.

The embodiment of the present invention also provides a system for establishing a virtual base station, as shown in FIG. 29, the system includes: an operator server 291, a wireless network controller 292, a radio access network 293, a multimode terminal 294, and a core network 295 of the multimode terminal.

The operator server 291 sends a notification message of poor network coverage to the wireless network controller 292, where the notification message of the poor network coverage includes information of a location where a network coverage level of a second mode is lower than the network coverage threshold and information of the second mode; after receiving the message, the wireless network controller 292 determines the multimode terminal 294 capable of being compatible with the second mode, according to the information of the location where the network coverage level of the second mode is lower than the network coverage threshold and the information of the second mode in the message; after the determining, the wireless network controller 292 returns an identification of the multimode terminal 294 to the operator server 291; after receiving the identification of the multimode terminal 294, the operator server 291 initiates a virtual base station establishment request to the wireless network controller 292, where the request message includes the identification of the multimode terminal 294 and the information of the second mode; the wireless network controller 292 forwards the virtual base station establishment request to the radio access network 293; the radio access network 293 forwards the virtual base station establishment request to the multimode terminal 294; the multimode terminal 294 generates a virtual machine, and loads a virtual base station mirror that is the same as the second mode, to generate a virtual base station; after the virtual base station is generated, the multimode terminal 294 sends a virtual base station successfully-established message to the radio access network 293, where the virtual base station successfully-established message carries an identification of the virtual base station; the radio access network 293 forwards the virtual base station successfully-established message to the wireless network controller 292; the wireless network controller 292 establishes a corresponding relation between the identification of the multimode terminal 294 and the identification of the virtual base station; the wireless network controller 292 forwards the virtual base station successfully-established message to the operator server 291; after receiving the message, the operator server 291 initiates a service information modification request message to the core network 295 of the multimode terminal, where the service information modification request message includes information of a default bearer, a dedicated bearer, charging and a bandwidth of the second mode, so as to satisfy a service requirement of at least one terminal of the second mode served by the virtual base station; the core network 295 of the multimode terminal establishes a data transmission path to a core network of the second mode according to the default bearer and the dedicated bearer of the second mode, and returns a successful response to the operator server 291 after establishing the data transmission path to the core network of the second mode.

Establishment of a virtual base station is completed via the above system, and a problem of poor network coverage is solved via the virtual base station established, the above system has a low cost and flexible deployment.

Figure 30:
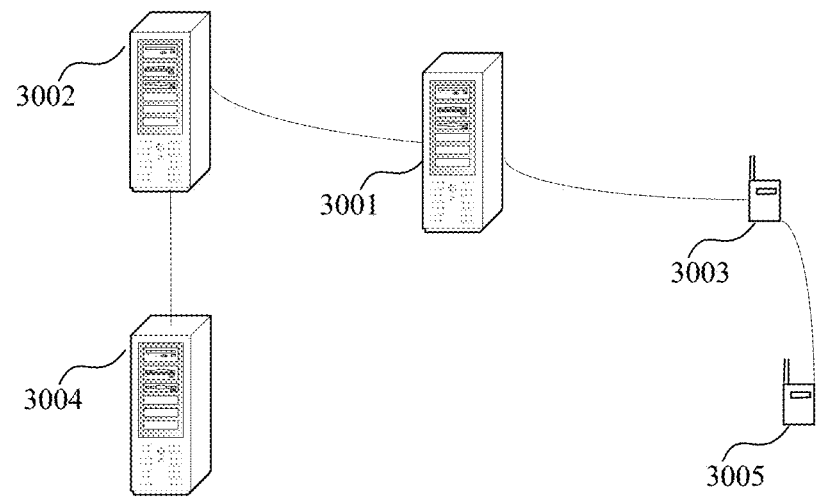
FIG. 30 is a diagram of a system for transferring data by using a virtual base station according to the embodiment 3 of the present invention.

The embodiment of the present invention also provides a system for transferring data by using a virtual base station, as shown in FIG. 30, the system includes: a radio access network 3001, a core network 3002 of a multimode terminal, a multimode terminal 3003, a core network 3004 of a second mode, and a terminal 3005 of the second mode.

The multimode terminal 3003 receives uplink data of the terminal 3005 of the second mode, and then forwards the uplink data to the radio access network 3001; the radio access network 3001 forwards the uplink data to the core network 3002 of the multimode terminal; the core network 3002 of the multimode terminal forwards the uplink data to the core network 3005 of the second mode, a data transmission path is established between the core network 3002 of the multimode terminal and the core network 3004 of the second mode, the core network 3002 of the multimode terminal forwards, via the data transmission path, the uplink data to the core network 3004 of the second mode corresponding to the terminal 3005 of the second mode.

The core network 3002 of the multimode terminal receives downlink data sent by the core network 3004 of the second mode, forwards the downlink data sent by the core network 3004 of the second mode to the radio access network 3001; the radio access network 3001 sends the downlink data sent by the core network 3004 of the second mode to the multimode terminal 3003; the multimode terminal 3003 sends the downlink data sent by the core network 3004 of the second mode to the terminal 3005 of the second mode.

Data transmission is achieved by transferring data via the above system, and wireless network coverage in a specific area is achieved by transferring uplink and downlink data orderly, which has a simple implementation process and flexible deployment.

The above descriptions are merely specific embodiments of the present invention; however, the protection scope of the present invention is not limited thereto. Any modification or replacement that may be readily envisaged of by persons skilled in the art within the protection scope of the present invention should fall into the protection scope of the present invention. Thus, the protection scope of the present invention shall be subject to the claims.

What is claimed is:

1. A method for establishing a virtual base station, comprising:
    receiving, by a wireless network controller, a notification message of poor network coverage sent by an operator server, wherein the notification message of the poor network coverage is sent by the operator server when a network coverage level in a network of a second mode is detected to be lower than a preset network coverage threshold, and comprises information of a location where the network coverage level of the second mode is lower than the network coverage threshold and information of the second mode, wherein the second mode is a second cellular network mode;
    acquiring, by the wireless network controller, according to the information of the location and the information of the second mode, a multimode terminal capable of being compatible with the second mode;
    returning, by the wireless network controller, an identification of the multimode terminal to the operator server;
    receiving, by the wireless network controller, a virtual base station establishment request message sent by the operator server, wherein the virtual base station establishment request message comprises the identification of the multimode terminal and the information of the second mode;
    forwarding, by the wireless network controller, according to the identification of the multimode terminal, the virtual base station establishment request message to the multimode terminal to enable the multimode terminal to generate a virtual machine and load a virtual base station mirror that is the same as the second mode to establish a virtual base station, wherein after the virtual base station is established successfully, the multimode terminal becomes a base station of at least one of terminals of the second mode and operates in the first mode to provide a data transmission path between a core network of the first mode and a core network of the second mode;
    receiving, by the wireless network controller, a virtual base station successfully-established message sent by the multimode terminal, wherein the virtual base station successfully-established message comprises an identification of the virtual base station; and
    forwarding, by the wireless network controller, the virtual base station successfully-established message to the operator server.

2. The method according to claim 1, wherein, the forwarding the virtual base station establishment request message to the multimode terminal comprises:
    sending, by the wireless network controller, the virtual base station establishment request message to a radio access network (RAN), and forwarding, by the RAN, the virtual base station establishment request message to the multimode terminal.

3. The method according to claim 1, wherein the receiving a virtual base station successfully-established message sent by the multimode terminal comprises:
receiving, by the wireless network controller, the virtual base station successfully-established message sent by the multimode terminal and forwarded by the RAN.

4. The method according to claim 1, wherein after the receiving a virtual base station successfully-established message sent by the multimode terminal, further comprising:
establishing, by the wireless network controller, a corresponding relation between the identification of the multimode terminal and the identification of the virtual base station.

5. The method according to claim 4, further comprising:
receiving, by the wireless network controller, a virtual base station destruction request message sent by the operator server, wherein the virtual base station destruction request message comprises the identification of the virtual base station;
sending, by the wireless network controller, a data transmission path release message to a core network of the multimode terminal to release the data transmission path to a core network of the second mode;
receiving, by the wireless network controller, a successfully-released message returned by the core network of the multimode terminal;
determining, by the wireless network controller, the multimode terminal according to the identification of the virtual base station and the corresponding relation between the identification of the multimode terminal and the virtual base station;
sending, by the wireless network controller, a virtual base station deletion request message to the RAN to enable the RAN to forward the virtual base station deletion request message to the multimode terminal, wherein the virtual base station deletion request message comprises the identification of the virtual base station;
receiving, by the wireless network controller, a virtual base station successfully-deleted message sent by the multimode terminal and forwarded by the RAN, wherein the virtual base station successfully-deleted message is sent by the multimode terminal after a virtual base station mirror corresponding to the identification of the virtual base station is unloaded and the virtual machine is deleted;
deleting, by the wireless network controller, the corresponding relation between the identification of the multimode terminal and the identification of the virtual base station; and
forwarding, by the wireless network controller, the virtual base station successfully-deleted message to the operator server.

6. The method according to claim 1, wherein the multimode terminal operates in a WIFI mode or a first cellular network mode.

7. A wireless network controller, comprising:
a second receiving unit, configured to receive a notification message of poor network coverage sent by an operator server, wherein the notification message of the poor network coverage is sent by the operator server when a network coverage level in a network of a second mode is detected to be lower than a preset network coverage threshold, and comprises information of a location where the network coverage level of the second mode is lower than the network coverage threshold and information of the second mode, wherein the second mode is a second cellular network mode;
a multimode terminal acquiring unit, configured to acquire, according to the information of the location and the information of the second mode, a multimode terminal capable of being compatible with the second mode;
a second sending unit, configured to return an identification of the multimode terminal to the operator server;
wherein the second receiving unit is further configured to receive a virtual base station establishment request message sent by the operator server, wherein the virtual base station establishment request message comprises the identification of the multimode terminal and the information of the second mode;
the second sending unit is further configured to forward, according to the identification of the multimode terminal, the virtual base station establishment request message to the multimode terminal, to enable the multimode terminal to generate a virtual machine and load a virtual base station mirror that is the same as the second mode to establish a virtual base station, wherein after the virtual base station is established successfully, the multimode terminal becomes a base station of at least one of terminals of the second mode and operates in the first mode to provide a data transmission path between a core network of the first mode and a core network of the second mode;
the second receiving unit is further configured to receive a virtual base station successfully-established message sent by the multimode terminal, wherein the virtual base station successfully-established message comprises an identification of the virtual base station; and
the second sending unit is further configured to forward the virtual base station successfully-established message to the operator server.

8. The wireless network controller according to claim 7, wherein the second sending unit is further configured to send the virtual base station establishment request message to a radio access network (RAN), and the RAN forwards the virtual base station establishment request message to the multimode terminal.

9. The wireless network controller according to claim 7, wherein the second receiving unit is further configured to receive the virtual base station successfully-established message sent by the multimode terminal and forwarded by the RAN.

10. The wireless network controller according to claim 7, further comprising:
a corresponding relation establishing unit, configured to establish a corresponding relation between the identification of the multimode terminal and the identification of the virtual base station.

11. The wireless network controller according to claim 10, wherein
the second receiving unit is further configured to receive a virtual base station destruction request message sent by the operator server, wherein the virtual base station destruction request message comprises the identification of the virtual base station;
the second sending unit is further configured to send a data transmission path release message to a core network of the multimode terminal to release the data transmission path to a core network of the second mode;

the second receiving unit is further configured to receive a successfully-released message returned by the core network of the multimode terminal;

the wireless network controller further comprises a multimode terminal determining unit, configured to determine the multimode terminal according to the identification of the virtual base station and the corresponding relation between the identification of the multimode terminal and the virtual base station;

the second sending unit is further configured to send a virtual base station deletion request message to the RAN to enable the RAN to forward the virtual base station deletion request message to the multimode terminal, wherein the virtual base station deletion request message comprises the identification of the virtual base station;

the second receiving unit is further configured to receive a virtual base station successfully-deleted message sent by the multimode terminal and forwarded by the RAN, wherein the virtual base station successfully-deleted message is sent by the multimode terminal after a virtual base station mirror corresponding to the identification of the virtual base station is unloaded and the virtual machine is deleted;

a corresponding relation deleting unit, configured to delete the corresponding relation between the identification of the multimode terminal and the identification of the virtual base station; and the second sending unit is further configured to forward the virtual base station successfully-deleted message to the operator server.

12. A multimode terminal, comprising:

a fourth receiving unit, configured to receive a virtual base station establishment request message sent by an operator server and forwarded by a wireless network controller, wherein the virtual base station establishment request message comprises an identification of the multimode terminal and information of a second mode, wherein the second mode is a second cellular network mode;

a virtual base station generating unit, configured to generate a virtual machine, and load a virtual base station mirror that is the same as the second mode to establish a virtual base station, wherein after the virtual base station is established successfully, the multimode terminal becomes a base station of at least one of terminals of the second mode and operates in the first mode to provide a data transmission path between a core network of the first mode and a core network of the second mode; and a fourth sending unit, configured to return a virtual base station successfully-established message to the wireless network controller, wherein the virtual base station successfully-established message comprises an identification of the virtual base station, and the virtual base station successfully-established message is forwarded to the operator server via the wireless network controller.

13. The multimode terminal according to claim 12, wherein the fourth receiving unit is further configured to receive a virtual base station deletion request message sent by the wireless network controller and forwarded by a radio access network (RAN), wherein the virtual base station deletion request message comprises the identification of the virtual base station;

a virtual base station deleting unit, configured to unload a virtual base station mirror corresponding to the identification of the virtual base station and delete the virtual machine; and the fourth receiving unit is further configured to return a virtual base station successfully-deleted message to the RAN, wherein the virtual base station successfully-deleted message is forwarded by the RAN to the wireless network controller, and is forwarded by the wireless network controller to the operator server.

* * * * *